US010491501B2

United States Patent
Armolavicius et al.

(10) Patent No.: US 10,491,501 B2
(45) Date of Patent: Nov. 26, 2019

(54) TRAFFIC-ADAPTIVE NETWORK CONTROL SYSTEMS AND METHODS

(71) Applicant: Ciena Corporation, Hanover, MD (US)

(72) Inventors: Romualdas Armolavicius, Stittsville (CA); Todd Morris, Stittsville (CA); Petar Djukic, Ottawa (CA)

(73) Assignee: Ciena Corporation, Hanover, MD (US)

( * ) Notice: Subject to any disclaimer, the term of this patent is extended or adjusted under 35 U.S.C. 154(b) by 623 days.

(21) Appl. No.: 15/018,132

(22) Filed: Feb. 8, 2016

(65) Prior Publication Data

US 2017/0230267 A1 Aug. 10, 2017

(51) Int. Cl.
*H04L 12/26* (2006.01)
*H04L 12/24* (2006.01)

(52) U.S. Cl.
CPC .......... *H04L 43/0882* (2013.01); *H04L 41/20* (2013.01); *H04L 43/062* (2013.01)

(58) Field of Classification Search
CPC .... H04L 43/062; H04L 41/20; H04L 43/0882
USPC ........................................................ 709/201
See application file for complete search history.

(56) References Cited

U.S. PATENT DOCUMENTS

| | | |
|---|---|---|
| 7,443,831 B2 | 10/2008 | Shew et al. |
| 7,782,879 B2 | 8/2010 | Roch et al. |
| 7,787,494 B1 | 8/2010 | Aubin et al. |
| 7,957,417 B2 * | 6/2011 | McKinnon, III ... H04L 12/2801 370/468 |
| 8,644,710 B2 | 2/2014 | Wellbrock et al. |
| 8,666,247 B2 | 3/2014 | Srinivasan et al. |
| 8,670,315 B1 | 3/2014 | Armolavicius |
| 2010/0149971 A1 * | 6/2010 | Noriega ................. H04L 47/10 370/230 |
| 2013/0102301 A1 * | 4/2013 | Shinada ................ H04L 47/823 455/418 |
| 2014/0229210 A1 | 8/2014 | Sharifian et al. |
| 2014/0310388 A1 | 10/2014 | Djukic et al. |
| 2014/0328183 A1 | 11/2014 | Au et al. |
| 2014/0362688 A1 * | 12/2014 | Zhang ............... H04W 72/0486 370/230 |
| 2015/0171953 A1 | 6/2015 | Djukic et al. |
| 2015/0188837 A1 | 7/2015 | Djukic et al. |
| 2015/0195745 A1 * | 7/2015 | Farmanbar ........... H04W 28/12 370/236 |
| 2015/0200859 A1 | 7/2015 | Li et al. |
| 2015/0215235 A1 | 7/2015 | Li et al. |

(Continued)

OTHER PUBLICATIONS

OpenFlow Switch Specication; Version 1.1.0 Implemented ( Wire Protocol 0x02 ); pp. 1-56; Feb. 28, 2011.

(Continued)

*Primary Examiner* — June Y Sison
*Assistant Examiner* — Adam A Cooney
(74) *Attorney, Agent, or Firm* — Clements Bernard Walker; Christopher L. Bernard; Lawrence A. Baratta, Jr.

(57) ABSTRACT

Traffic-adaptive network control systems and methods for a network, implemented by a server, include monitoring data associated with the network; generating a traffic forecast based on the monitored data; generating a schedule of actions based on a comparison of the traffic forecast to observed data; and causing orchestration of the actions in the network based on the generated schedule. The network can include a Software Defined Networking (SDN) network.

20 Claims, 16 Drawing Sheets

(56) References Cited

U.S. PATENT DOCUMENTS

| | | | |
|---|---|---|---|
| 2016/0057234 A1* | 2/2016 | Parikh | H04L 67/16 |
| | | | 709/226 |
| 2016/0218948 A1* | 7/2016 | Djukic | H04L 43/0876 |
| 2016/0352648 A1* | 12/2016 | Iovanna | H04L 45/02 |
| 2017/0099211 A1* | 4/2017 | Iovanna | H04L 49/70 |
| 2017/0220968 A1* | 8/2017 | Lugo | G06Q 10/06314 |

OTHER PUBLICATIONS

Telecommunication Standardization Sector of ITU; ITU-T G.872; Series G: Transmission Systems and Media, Digital Systems and Networks; Digital networks—Optical transport networks; Architecture of optical transport networks; pp. 1-52; Oct. 2012.

* cited by examiner

TRAFFIC-ADAPTIVE NETWORK CONTROL SYSTEMS AND METHODS

FIELD OF THE DISCLOSURE

The present disclosure generally relates to networking systems and methods. More particularly, the present disclosure relates to traffic-adaptive network control systems and methods.

BACKGROUND OF THE DISCLOSURE

A centralized Software Defined Networking (SDN) management plane offers an opportunity to improve current network management practices with automated and optimized management processes. Centralized management is also a key pillar in enabling on-demand usage-based services, which is the direction network deployments are moving towards. One aspect of the SDN management plane includes network applications. Conventionally, the approach for dispatching network apps is for the user to call on them manually or to schedule them periodically. Typically, each action is scheduled separately and independent of other actions. Analytics are not used except to guide the network operator's intuition. When optimization solutions are provided to the user, it is often unclear when they should be run, or what their expected benefit is. The conventional approach suffers from not indicating to the operator when to run each network action or app. Also, they are missing the fact that multiple solutions should be considered jointly for the optimum set of actions. The operator is expected to select the action to execute on the network, based on observations and intuition. However, as this invention shows it is possible to select and schedule a set of actions that ensure that the network is running smoothly and satisfies its SLAs.

SDN, Virtual Network Functionality (VNF), and similar innovative technologies enable the building of networks that are flexible, programmable, and have highly automated operations. Such networks have both challenges and opportunities. For example, such networks support on-demand services having dynamic connections with varied durations and bandwidth requirements that may be scheduled in advance or that may arrive spontaneously. Ongoing connection arrivals and releases lead to sub-optimal resource use over time: a connection that used resources optimally when established may no longer be optimally routed due to resources freed by subsequent connection releases. Packet networks exhibit dynamically varying loads and are often designed to overbook installed capacity and poorly chosen static overbooking factors can lead to poor network utilization (higher cost) or a degraded user experience (high packet loss). Service requests may exhibit temporary predictable shifts in the community of interest (probability a connection belongs to a given A->Z pair) or volume induced by, for example, sporting or entertainment events, promotions, elections, or similar events. Service requests may exhibit temporary unpredictable shifts in the community of interest or volume induced by, for example, natural disasters, or terrorist attacks. Service requests may exhibit permanent (often predictable) shifts in community of interest or volume induced by, for example, opening a large office complex The combined effect of the above factors creates a mismatch between traffic demand and the network resources provided causing poorer network utilization, lost revenue, customer dissatisfaction, and higher network cost. Such networks will have ever-increasing functionality (e.g., network apps) that allows their response to traffic demand to be tailored to meet the needs of network resilience, protection, and shifting traffic patterns. Methods for effectively managing this functionality are either non-existent or inadequate. The programmability of and functional richness of such networks provides an opportunity for intelligent and automated resource management: without this automation resource management will be complex, highly manual, error-prone, and expensive.

BRIEF SUMMARY OF THE DISCLOSURE

In an exemplary embodiment, a traffic-adaptive network control method for a network, implemented by a server includes monitoring data associated with the network; generating a traffic forecast based on the monitored data; generating a schedule of actions based on a comparison of the traffic forecast to observed data; and causing orchestration of the actions in the network based on the generated schedule. The network can include a Software Defined Networking (SDN) network. The monitoring data can include monitoring traffic demands including packet volumes and connection setup and release requests in the network; and monitoring external events from exogenous data. The generating the traffic forecast can include maintaining a representation of traffic demand from the monitored traffic demands; generating a forecast from the representation based on a set of possible traffic evolution trajectories; and adjusting the forecast based on the external events. The actions can be performed in the network to one or more of recover capacity, reallocate capacity, and add capacity. The actions can be performed by one or more network applications configured to one or more of altering routing by changing parameters in a multilayer Path Computation Engine, moving existing or scheduled connections to new paths, acquiring capacity at layer k from layer k−1, and adding network equipment.

The method can further include generating an updated traffic forecast responsive to detecting a shift between the traffic forecast and the observed data. The method can further include generating a new schedule of actions based on a comparison of the updated traffic forecast to observed data. The generating the schedule of actions can include one or more of: utilizing a policy to address the traffic forecast; utilizing a decision tree from the traffic forecast to analyze candidate options of nodes of the decision tree using dynamic programming or stochastic optimization to find a schedule that minimizes costs; generating the schedule using a Monte-Carlo simulation with a least cost schedule being selected. The actions can include one or more of: modification of link costs, weights, bandwidth reservation levels, and parameters used to control path computation to steer connections to a more efficient use of resources; changing packet traffic overbooking parameters to remove network congestion; reclaiming stranded bandwidth by defragmenting bandwidth in multiple layers; requesting capacity from a lower layer in the network; adjusting optical power budgets to match traffic patterns and shift capacity in the network; adjusting width of optical signals to match traffic patterns and shift capacity in the network; adding capacity with new equipment; and adding new Virtual Network Functions.

In another exemplary embodiment, a traffic-adaptive network control apparatus for a network includes a network interface and a processor communicatively coupled to one another; and memory storing instructions that, when executed, cause the processor to monitor data, received by the network interface, associated with the network, generate a traffic forecast based on the monitored data, generate a schedule of actions based on a comparison of the traffic forecast to observed data, and cause orchestration of the actions in the network based on the generated schedule. The network can include a Software Defined Networking (SDN) network. To monitor the data, the memory storing instructions that, when executed, can further cause the processor to monitor traffic demands including packet volumes and connection setup and release requests in the network, and monitor external events from exogenous data. To generate the traffic forecast, the memory storing instructions that, when executed, can further cause the processor to maintain a representation of traffic demand from the monitored traffic demands, generate a forecast from the representation based on a set of possible traffic evolution trajectories, and adjust the forecast based on the external events.

The actions can be performed in the network to one or more of recover capacity, reallocate capacity, and add capacity. The actions can be performed by one or more network applications configured to one or more of altering routing by changing parameters in a multilayer Path Computation Engine, moving existing or scheduled connections to new paths, acquiring capacity at layer k from layer k−1, and adding network equipment. The memory storing instructions that, when executed, can further cause the processor to generate an updated traffic forecast responsive to detecting a shift between the traffic forecast and the observed data. The memory storing instructions that, when executed, can further cause the processor to generate a new schedule of actions based on a comparison of the updated traffic forecast to observed data. The schedule of actions can include one or more of: utilization of a policy to address the traffic forecast; utilization of decision tree from the traffic forecast to analyze candidate options of nodes of the decision tree using dynamic programming or stochastic optimization to find a schedule that minimizes costs; generation of the schedule using a Monte-Carlo simulation with a least cost schedule being selected.

In a further exemplary embodiment, a Software Defined Networking (SDN) network includes a plurality of interconnected nodes adapted to provide traffic at a capacity between one another at one or more layers; an SDN controller communicatively coupled to one or more of the plurality of interconnected nodes; a plurality of network applications communicatively to the SDN controller and the plurality of interconnected nodes; and an application orchestrator communicatively coupled to the SDN controller and the plurality of network applications, wherein the application orchestrator is adapted to monitor data associated with the network, generate a traffic forecast based on the monitored data, generate a schedule of actions based on a comparison of the traffic forecast to observed data, and cause orchestration of the actions in the network based on the generated schedule.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server which may be used to realize the SDN controller, the various functional components, or the like;

DETAILED DESCRIPTION OF THE DISCLOSURE

Figure 1:
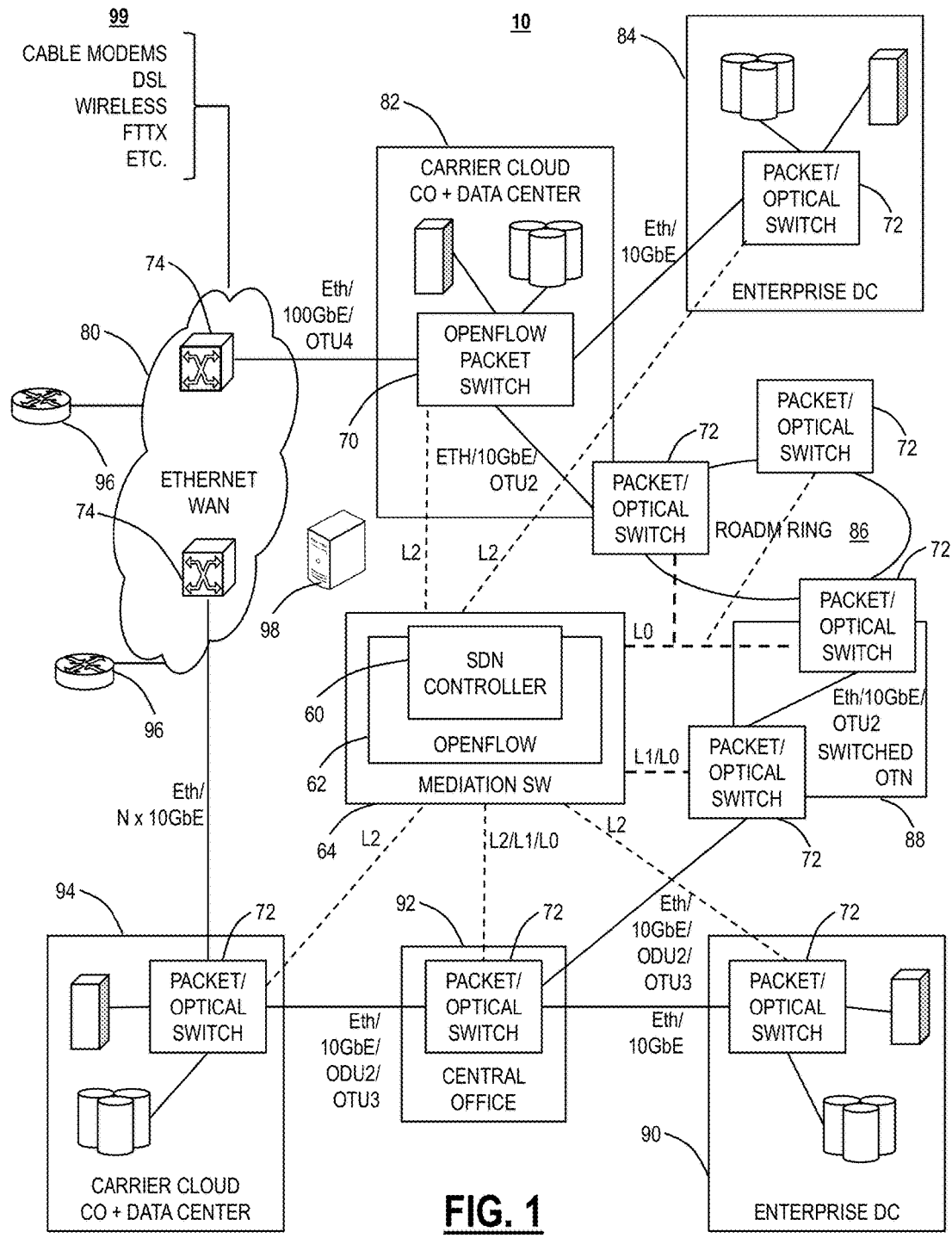
FIG. 1 is a network diagram of an exemplary Software Defined Networking (SDN) network 10 for describing the systems and methods.

In various exemplary embodiments, the present disclosure relates to traffic-adaptive network control systems and methods. The systems and methods include monitoring the traffic demand (e.g., packet volumes, connection setup and release requests) offered to the network and maintaining representations or models of traffic demand using one or more statistical or machine learning models. The traffic demand models are used to create a traffic forecast that includes a set of possible traffic evolution trajectories with associated probabilities of occurrence. The systems and methods further include monitoring external events that can affect network traffic demand. The external events can include natural and man-made disasters, weather events, sporting or political events, changes in served population, and the like. The systems and methods include translating these external events into adjustments of the demand traffic models which can use a range of adaptive responses or actions (Network Apps) that can recover, reallocate, or add capacity. The responses or actions can include altering path computation weights, employing resource reservation, moving connections to better routes, accessing temporary capacity using mechanisms such as mining optical margin, Virtual Network Functions (VNF), requesting layer k capacity from layer k−1, adding network equipment, and the like. The systems and methods include determining, at each forecast time, the orchestration of capacity recovery/enhancement options that meet expected demand and collectively minimize the cost of capacity over the forecast lifetime under the guidance of a user-defined policy. The orchestration is driven by an action plan and schedule that manages the invocation of actions.

An exemplary objective of the systems and methods provides an optimized network. Operators require a responsive network that defers the need to add physical resources can be operated at a higher utilization for an equivalent level of performance (blocking of connection requests, for example), and can generate greater revenue than otherwise possible. The systems and methods can include determining how to orchestrate a set of network resource management procedures to minimize the network cost. This type of orchestration is novel compared to the current orchestration mechanisms used for creating a data plane. This orchestration is based on the construction of an activation plan and schedule that minimizes the cost of resource management. The activation plan is constructed using analytics, machine learning or statistical models, and optimization algorithms. The invocation of the resource management procedures is completely automated and under the control of the activation plan.

Second, the systems and methods can use analytics from both network measurements and external measurements to determine a network forecast. Third, the systems and methods forecast network traffic using information measured in the network and information exogenous to the network and then select and schedule a set of network actions to undertake (run network apps) to ensure that the network operates within agreed upon service level agreements at a minimum cost to the operator. Fourth, the systems and methods also contain several techniques required to validate and adjust traffic forecasts as well as to select and schedule actions to minimize the expected network cost to the operator. For example, machine learning is used to determine forecasting models and to determine the best set of actions.

Exemplary SDN Network

Referring to FIG. 1, in an exemplary embodiment, a network diagram illustrates an exemplary SDN network 10 for describing the systems and methods. Those of ordinary skill in the art will recognize that any network configuration, such as at Layers 0, 1, 2, and/or 3, is contemplated with the systems and methods, and the network 10 is merely presented for illustration. The network 10 is an SDN network, which includes an SDN controller 60 with the ability to (logically) centrally program provisioning of forwarding in the network 10 in order for more flexible and precise control over network resources to support new services. Application Programmable Interfaces (APIs) provide programmatic communication between the SDN controller 60 and either (i) specific applications or (ii) programmable network devices such as communication over Transaction Language-1 (TL-1) or Common Object Request Broker Architecture (CORBA) calls. OpenFlow (www.openflow.org) is an example implementation of a special OpenFlow interface 62 from the SDN controller 60 to programmable network devices. It may or may not communicate via mediation software 64, to each switch 70, 72, 74 in the network 10 in order to provision the forwarding table at each switch along a connection path in order to instantiate the forwarding behavior needed for the connection. OpenFlow is described, for example, in the OpenFlow Switch Speciation, Version 1.1.0 (February 2011)-Version 1.3.0 (June 2012), the contents of which are incorporated by reference herein. While OpenFlow describes one version of an SDN interface, other SDN protocols besides OpenFlow (such as Nedlow, REST, etc.) are also contemplated with the systems and methods described herein.

Again, for illustration purposes, the network 10 includes an OpenFlow-controlled packet switch 70, various packet/optical switches 72, and packet switches 74 with the switches 70, 72 each communicatively coupled to the SDN controller 60 via the OpenFlow interface 62 and the mediation software 64 at any of Layers 0-3 (L0 being DWDM, L1 being OTN, and L2 being Ethernet). The switches 70, 72, 74, again for illustration purposes only, are located at various sites, including an Ethernet Wide Area Network (WAN) 80, a carrier cloud Central Office (CO) and data center 82, an enterprise data center 84, a Reconfigurable Optical Add/Drop Multiplexer (ROADM) ring 86, a switched OTN site 88, another enterprise data center 90, a central office 92, and another carrier cloud Central Office (CO) and data center 94. The network 10 can also include IP routers 96 and a network management system (NMS) 98. Note, there can be more than one of the NMS 98, e.g., an NMS for each type of equipment—each communicatively coupled to the SDN controller 60. Again, the network 10 is shown just to provide context and typical configurations at Layers 0-3 in an SDN network for illustration purposes. Those of ordinary skill in the art will recognize various other network configurations are possible at Layers 0-3 in the SDN network.

The switches 70, 72, 74 can operate, via SDN, at Layers 0-3. The OpenFlow packet switch 70, for example, can be a large-scale Layer 2 Ethernet switch that operates, via the SDN controller 60, at Layer 2 (L2). The packet/optical switches 72 can operate at any of Layers 0-3 in combination. At Layer 0, the packet/optical switches 72 can provide wavelength connectivity such as via DWDM, ROADMs, etc., at Layer 1, the packet/optical switches 72 can provide time division multiplexing (TDM) layer connectivity such as via Optical Transport Network (OTN), Synchronous Optical Network (SONET), Synchronous Digital Hierarchy (SDH), etc., at Layer 2, the packet/optical switches 72 can provide Ethernet or Multi-Protocol Label Switching (MPLS) packet switching and at Layer 3 the packet/optical switches can provide IP packet forwarding. The packet switches 74 can be traditional Ethernet switches that are not controlled by the SDN controller 60. The network 10 can include various end user access technologies 99, such as, without limitation, cable modems, digital subscriber loop (DSL), wireless, fiber-to-the-X (e.g., home, premises, curb, etc.), and the like.

Generally, SDN opens new mechanisms for network management in the network 10. Specifically, network services are provided through real-time provisioning of on-demand services by a centralized control plane which can be referred to as an SDN management plane. A network service may refer to a connection between clients (e.g., point-to-point Virtual Private Network (VPN) L3 or L2 connection, over OTN or other technologies); a virtual network with multiple point-to-point connections, point-to-multipoint connections, or multipoint-to-multipoint connections between multiple client sites (e.g., data centers, many-to-many business connections); or the like. The network services may be on-demand requiring immediate, deferred or periodic bandwidth. Immediate bandwidth may be required for connections that have real-time requirements (i.e., direct business to business connection such as banks), deferred bandwidth may be for connections that know their future demands (i.e., live television events, planned network migration, etc.,), and periodic bandwidth may be for connections that have a periodic bandwidth pattern (i.e., backup between data centers, daily mobile cellular traffic, etc.).

From a terminology perspective, the switches 70, 72, 74 can be referred to as nodes or network elements. The network 10 includes a plurality of nodes that are interconnected—the interconnections of the nodes can be a Layers 0 (optical), 1 (TDM), 2 (packet), or the like, as well as a combination thereof. Also, the network 10 (and other networks) contemplate other types of devices for the nodes. As described herein, the nodes are managed/controlled by the SDN controller 60 and/or the NMS 98. As part of providing network management, which is generally known as Operations, Administration, Maintenance, and Provisioning (OAM&P), the nodes are operated accordingly to policies. The systems and methods described herein propose traffic-adaptive network control systems and methods using analytics on network measurements and external information to forecast network traffic. The forecast is then used to generate a set of actions (apps) to run and their sequence in time. The actions are generated in a way to minimize the expected cost of the network 10 while the network 10 operates according to its external service level agreements (SLAs).

SDN Controller/Management Plane

Figure 2:
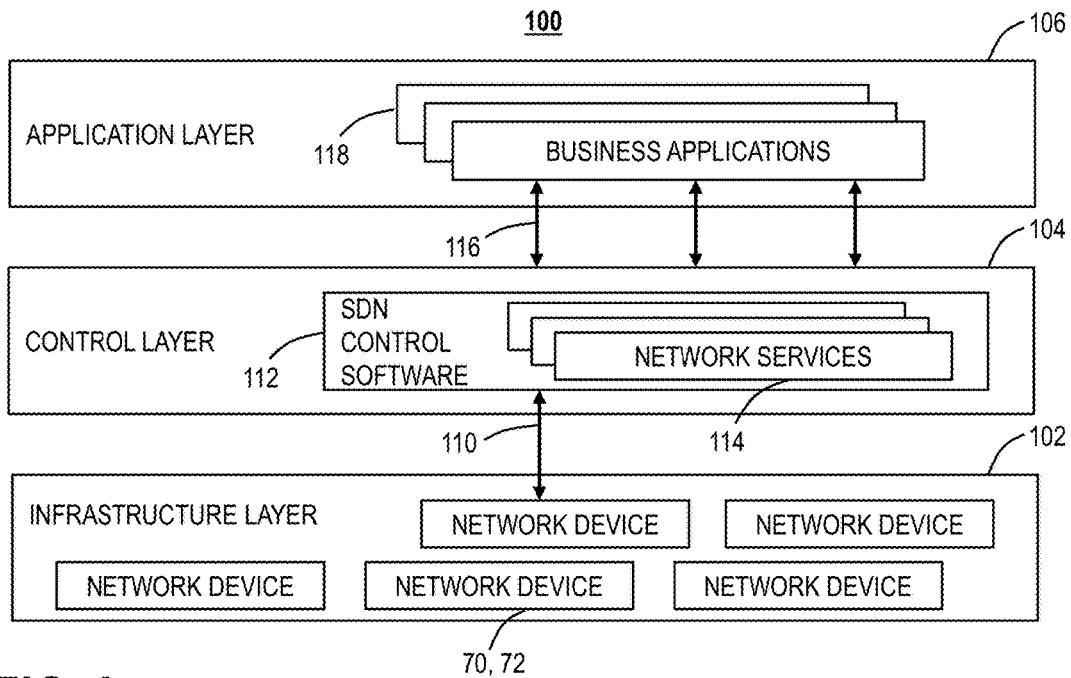
FIG. 2 is a block diagram of functional components of an SDN environment.
Figure 3:
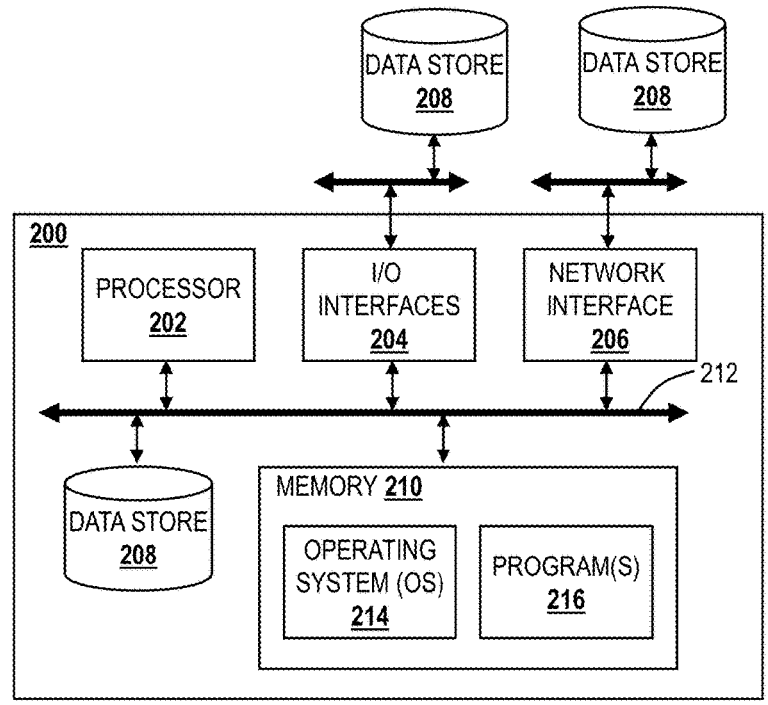

Referring to FIG. 2, in an exemplary embodiment, a block diagram illustrates functional components of the SDN environment 100. The SDN environment 100 includes a programmable infrastructure layer 102, a control layer 104, and an application layer 106. The layers 104, 106 can be implemented on a server or the like such as illustrated in FIG. 3 and the functional components can be implemented in software executed on the server. The programmable infrastructure layer 102 includes network devices such as the switches 70, 72 and is communicatively coupled to the control layer 104 via an interface 110 such as OpenFlow, for example. The control layer 104 facilitates communication between the application layer 106 and the network devices 70, 72 located in programmable infrastructure layer 102. The control layer 104 includes SDN control software 112 with a plurality of network services 114. The control layer 104 provides SDN functionality to manage network services through abstraction of lower level functionality. The application layer 106 communicates with the control layer 104 through various Application Programming Interfaces (APIs) 116. The application layer 106 provides end user connectivity to the SDN environment 100 such as software modules and/or functions responsible for creating the desired path and flow connections on the physical network through various business applications 118. In an exemplary embodiment, the systems and methods described herein are implemented as one of the business applications 118 on the SDN controller 60 and/or on a separate server 200.

Referring to FIG. 3, in an exemplary embodiment, a block diagram illustrates a server 200 which may be used to realize the SDN controller 60, the various functional components associated with the traffic-adaptive network control systems and methods, or the like. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10 GbE) or a wireless local area network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Traffic-adaptive Network Control Functional Components

Figure 4:
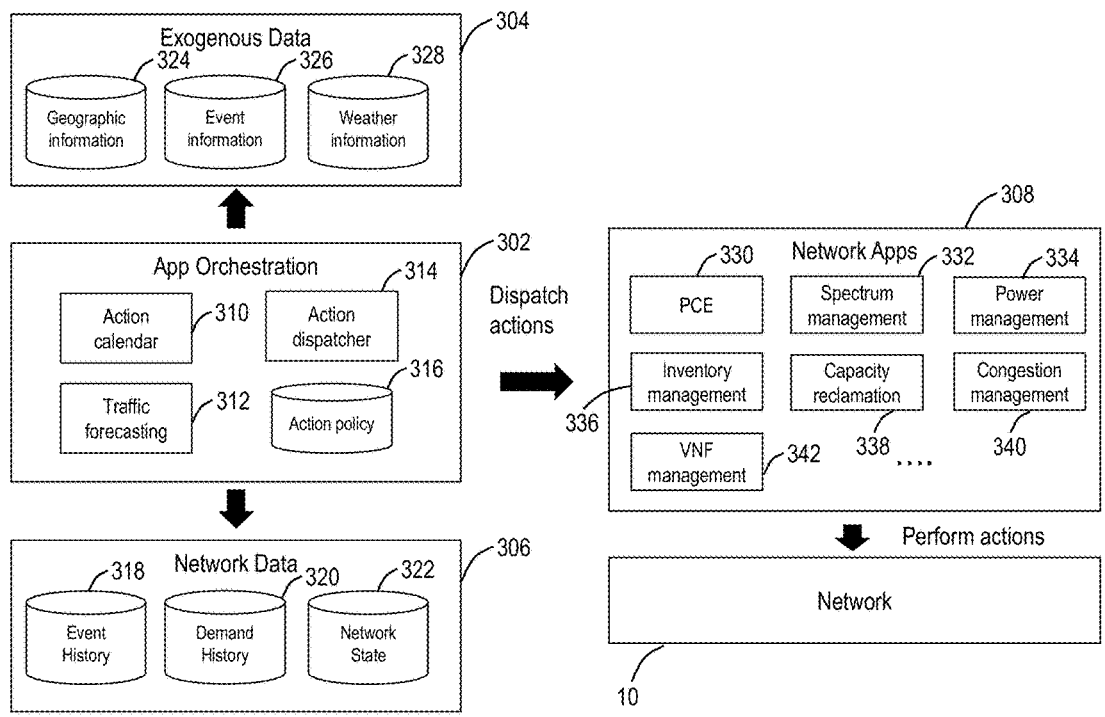
FIG. 4 is a block diagram of functional components for the traffic-adaptive network control systems and methods.

Referring to FIG. 4, in an exemplary embodiment, a block diagram illustrates functional components 300 for the traffic-adaptive network control systems and methods. The functional components 300 contemplate operation on one or more servers 200, such as part of the SDN environment 100, to control actions in the network 10. In an exemplary embodiment, the functional components 300 can be part of the application layer 106 and the control layer 104 to control the network 10, i.e., the infrastructure layer 102. The functional components 300 can be logically grouped based on data gathering and functionality. For example, the functional components 300 can include app orchestration 302, exogenous data 304, network data 306, and network apps 308. The app orchestration 302 includes an action calendar 310, traffic forecasting 312, an action dispatcher 314, and action policy 316. The network data 306 can include event history 318, demand history 320, and network state 322. The exogenous data 304 can include geographic information 324, event information 326, and weather information 328. The network apps 308 can include a Path Computation Element (PCE) 330, spectrum management 332, power management 334, inventory management 336, capacity reclamation 338, congestion management 340, and VNF management 342.

Again, the functional components 300 can operate in the SDN environment 100. The SDN environment 100 is enabling new, automated, ways of managing the network. In the SDN environment 100, the devices are controlled by the SDN control plane, which provides a set of application programming interfaces (APIs), which can be used to build management software on top of it ("apps"). The apps manage network resources to decrease operator's costs or to increase operator's revenue.

The functional components 300 provide an app orchestrator infrastructure which orchestrates network resource management actions (in the network 10) that ensure that the network 10 maintains service level agreements (SLAs) with minimum cost to the network operator. The traffic forecasting 312 forecasts the traffic using internal and external sources as from the exogenous data 304 and the network data 306. The traffic forecasting 312 can construct representations or models of traffic data that have been collected and that can be used to forecast future traffic. These models have the following capabilities. First, the models can track shifts in traffic demand where the models are able to detect changes and compensate for shifts in traffic volumes or patterns while minimizing false positives in order to model faithfully the observed data. Second, the models produce accurate forecasts maintaining a prediction error as small as possible. The action calendar 310 (or schedule) records the actions and when they should be taken. The action dispatcher 314 orchestrates the actions as prescribed in the action calendar 310.

With the functional components 300, a variety of network data 306 such as end-to-end packet flow volumes, connection setup and release rates are monitored. The functional components 300 adjust the free parameters of traffic demand forecasting models to ensure that the prediction error associated with the models remains within acceptable bounds as set by the operator. The functional components 300 may use multiple models switching among them or using them in aggregate to ensure that prediction errors are kept acceptably low. The functional components 300 use the traffic models to generate a traffic forecast in a range of possible traffic evolution scenarios parameterized by time and by their probability of occurrence. The functional components 300 also monitor external data, i.e., the exogenous data 304, related to man-made or natural disasters, severe weather notifications, ongoing construction projects that could affect outside plant, sporting or other events that could affect traffic volumes, patterns, or predictions. The functional components 300 maintain a historical record of such events and uses specialized analytical tools and models to convert this data into adjustments of the traffic evolution scenarios.

The network apps 308 can perform a variety of actions in the network 10. The actions are management/recovery and enhancement options that include, but are not limited to, altering routing by changing the free parameters in a multilayer PCE, moving existing or scheduled connections to new paths, acquiring capacity at layer k from layer k−1, and adding network equipment. Constraints and overall guidance to the functional components 300 are provided by the user-defined action policy 316.

Effective network resource management requires the knowledge of traffic patterns and traffic behavior in the network 10. For example, path computation can be modified to increase weights on links which are anticipated to have to carry an increased volume of future traffic. Or if increased packet congestion is observed, packet connections can be moved to decrease it.

Some examples of network resource management actions using analytics are as follows. Path computation via the PCE 330 using path computation algorithms where link weights can be changed depending on traffic volumes and traffic patterns. Reclamation of stranded bandwidth via the capacity reclamation 338 where stranded bandwidth may be reclaimed by defragmenting bandwidth in multiple layers. Overbooking of packet traffic via the congestion management 340 where packet traffic overbooking parameters may be changed to remove network congestion. Management of optical power budgets via the power management 334 where optical power budgets may be adjusted to match traffic patterns and shift capacity in the network (e.g., using adaptive modulation format changes). Management of optical spectrum via the spectrum management 332 where the width of optical signals may be adjusted to match traffic patterns and shift capacity in the network (e.g., using adaptive modulation format changes). Network planning via the inventory management 336 where network traffic forecasts may be used to plan equipment installation before the network 10 becomes too congested. Virtual network function tracking and instantiation via the VNF management 342 where the performance of virtual network functions may be tracked for performance, and new virtual network function may be added to improve network performance. Network equipment tracking and ordering via the inventory management 336 where network equipment may be tracked, staged, or ordered to ensure it is available where and when it is needed for installations.

Each network resource management action provides some benefits, but it may also result in associated costs (e.g., connection downtime, equipment cost, operator time). The effectiveness (benefits) of each action depends on the traffic situation in the network 10 and may require time to run. For example, some actions may only be performed in maintenance windows and some may require handling of manufacturer lead times. It is important to use traffic forecasts to enact network resource management actions at appropriate times and ensure that an action is performed before the traffic situation deteriorates and the action becomes ineffective.

Orchestration of Network Resource Management Actions

Figure 5:
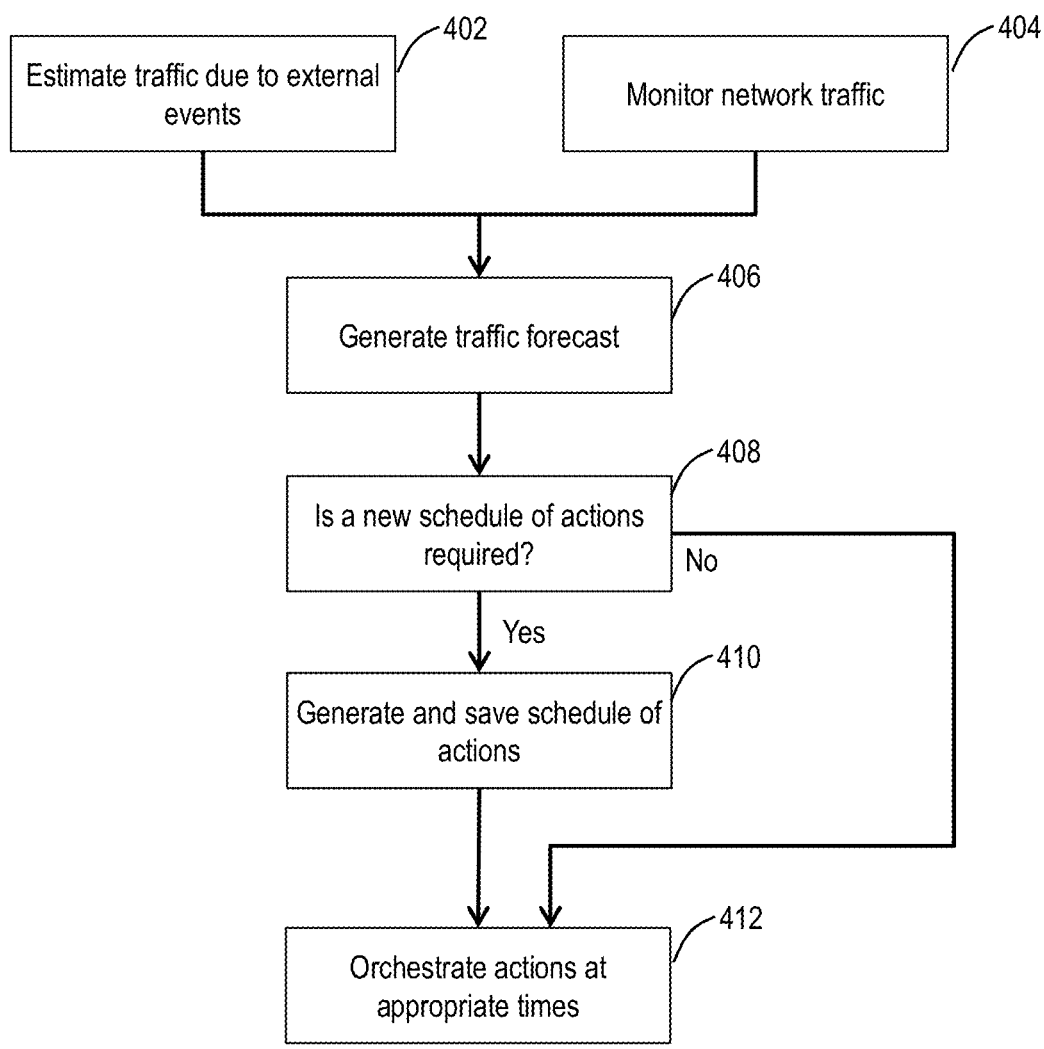
FIG. 5 is a flowchart of a process for orchestration of network resource management actions.

Referring to FIG. 5, in an exemplary embodiment, a flowchart illustrates a process 400 for orchestration of network resource management actions. Specifically, the process 400 can be implemented through the functional components 300. The process 400 uses exogenous network information and measured network information to arrive at probabilistic traffic forecasts and then schedules network actions. The process 400 includes estimating traffic due to external events (step 402) and monitoring network traffic (step 404). Step 402 can use the exogenous data 304 and step 404 can use the network data 306. Next, the process 400 includes generating traffic forecasts (step 406). The process 400 includes monitoring and maintaining representations or models of network traffic demand using one or more statistical or machine learning models. These models are used to create a traffic forecast that includes a set of possible traffic evolution trajectories with associated probabilities of occurrence. The process 400 also monitors events that can affect network traffic demand and translates this demand into adjustments of the traffic models and forecasts. To create traffic forecasts, the process 400 uses both internal network measurements as well as exogenous measurements.

The process 400 includes checking if a new schedule of actions is required (step 408). To save on computational effort, after the traffic forecasts is generated the process 400 includes determining if any change in the scheduled actions is required. One way to make the decision is to compare the forecast used to generate the previous schedule with the new forecast. Another way to make this decision is to simulate the scheduled actions against the new forecast and see if the SLAs will be met with the current schedule.

If a new schedule of actions is required (step 408), the process 400 generates and saves a schedule of actions. The process 400 determines the optimal set of actions and their schedule to ensure network performance meets SLAs while the expected network costs are minimized over the forecast lifetime. One way to generate the schedule is from a policy (e.g., network defragmentation is always done before network planning). Another way is to use a more sophisticated method. Since forecasts have an associated probability of occurrence, it is necessary to evaluate several paths in the possible schedule to find the path with the minimum expected cost. This can be done with Monte-Carlo simulations or dynamic programming approaches. After step 410 or if no new schedule is required (step 408), the process includes orchestrating actions at appropriate times (step 412). While the calendar of actions is generated, various actions are analyzed for each future time. At each such time, the app orchestrator 302 examines the traffic prediction cross-section and determines the set of option recommendations that minimizes the expected cost of capacity management over the life of the forecast. As the network evolves in time, the process 400 includes orchestrating the application of the capacity recovery options that come due for the particular evolution trajectory that is being tracked.

Generate Traffic Forecast

Figure 6:
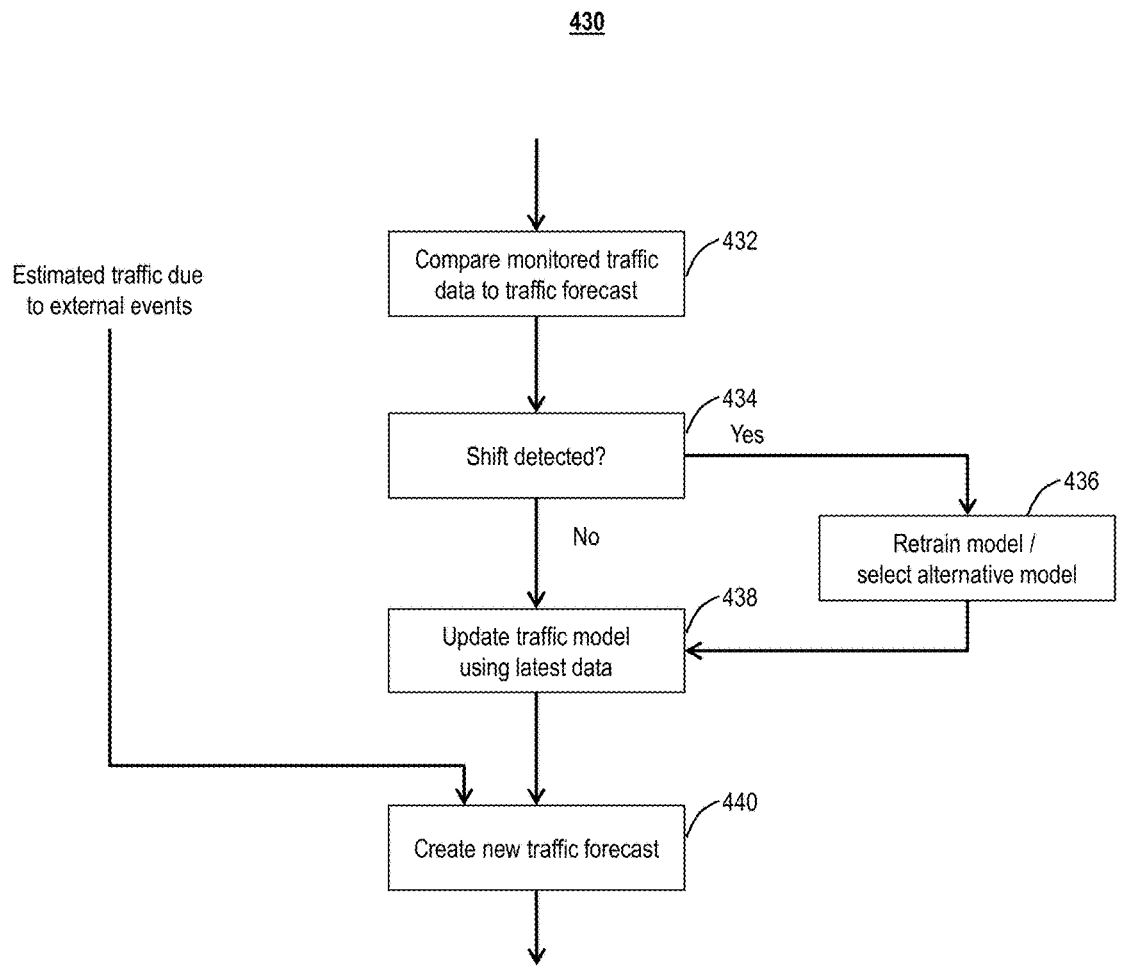
FIG. 6 is a flowchart of additional detail of a process for performing the generate traffic forecast step in the process of FIG. 5.

Referring to FIG. 6, in an exemplary embodiment, a flowchart illustrates additional detail of a process 430 for performing the generate traffic forecast step 406 in the process 400. The process 430 includes comparing monitored traffic data to the traffic forecast (step 432). The basis of making predictions relies on two assumptions, namely i) the availability of a model or representation of data observed in the past (fitting errors must be small), and ii) the representation continuing to be a faithful representation of data observed in the future. In practice, the first assumption (i) is relatively easy to satisfy compared to the second (ii). Two possibilities emerge for the second (ii) for the forecast error defined as error=forecast−observation, namely (1) the error suddenly increases after being low for a period of time or (2) the error continues to be small in a statistically predictable way.

Based on step 432, the process 430 includes detecting a shift between the monitored traffic data and the traffic forecast (step 434), namely a shift in the forecast error. For the first possibility (1), the process 430 includes retraining the model or selecting an alternative model (step 436). For the second possibility (2), the model continues to have low prediction error even though this may be due to the use of a more sophisticated model that can handle shifts using internal states that detect the shifts and produce consistently small prediction errors. The second possibility (2) requires no further action while the first possibility (1) may require the selection of a different model, a different window for fitting the existing model, or retraining of a neural network or other machine learning algorithm to correct its behavior.

If there is no shift (step 434) and after step 436, the process 430 includes updating the traffic model using the latest data (step 438). Once the issues of a possible traffic shift have been resolved, the resulting model is updated (refit) to the latest observations to bring the traffic representation up to date. Finally, the process 430 includes creating a new traffic forecast (step 440) based on the exogenous data 304 and the network data 306.

A New Schedule of Actions

Figure 7:
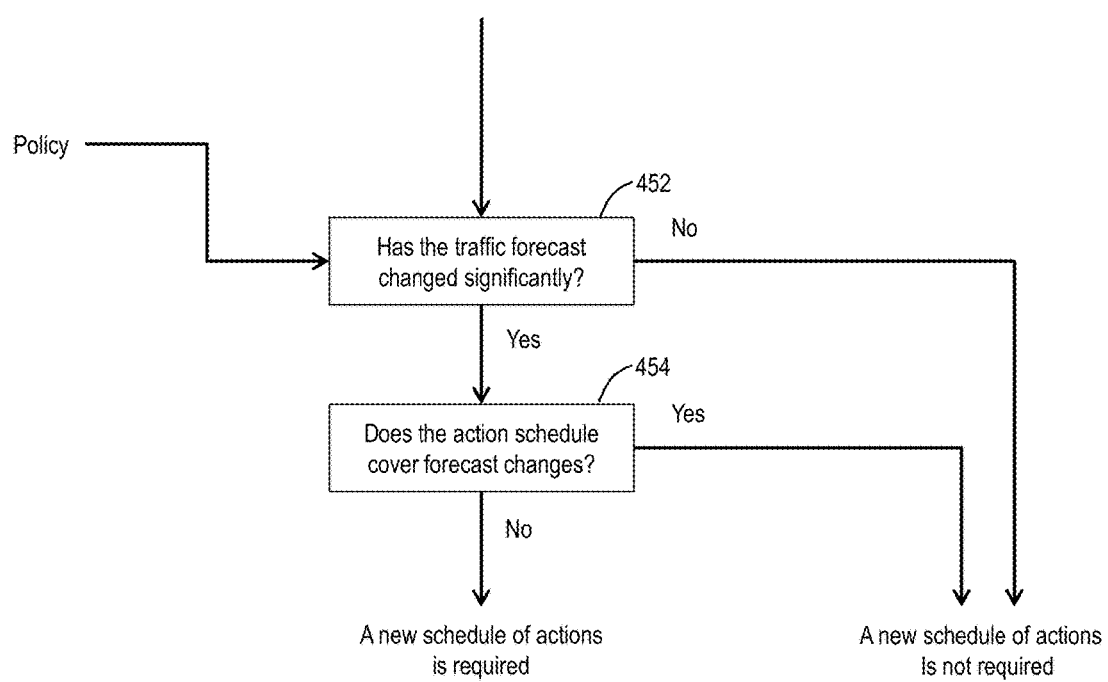
FIG. 7 is a flowchart of additional detail of a process for determining if a new schedule of actions is required in the process of FIG. 5.

Referring to FIG. 7, in an exemplary embodiment, a flowchart illustrates additional detail of a process 450 for determining if a new schedule of actions is required (step 408) in the process 400. Depending on the model, how it is used to generate the action schedule and the current set of observations a new forecast may or may not represent a significant departure from the previous forecast. Here, the significance is interpreted in the sense of impact on the action schedule: a significant deviation is one that renders the previous action schedule (based on the previous forecast) invalid. If the forecast has changed significantly, therefore, an indication must be produced that a new action schedule is needed. The process 450 includes checking of the traffic forecast has changed significantly, based on policy (step 452). If not (step 452), a new schedule of actions is not required.

Next, the process 450 includes checking if the action schedule covers forecast changes (step 454). Depending on the implementation, the traffic forecast may be very simple (for example, a simple regression line) or complex (for example, including probability distributions describing the full ensemble of possible evolution trajectories). Since the action schedule is based on the forecast, for the case where the forecast is a simple regression line a shift in the line is likely to have a significant impact on the action schedule. For a more sophisticated model based on probability lattice, for example, a change is demand is simply the tracing of a different path in the prediction lattice and no change is needed to the forecast or the plan. If the action plan is significantly impacted by a forecast change, then an indication must be produced that a new action schedule is needed.

Generate Schedule of Actions

Figure 8:
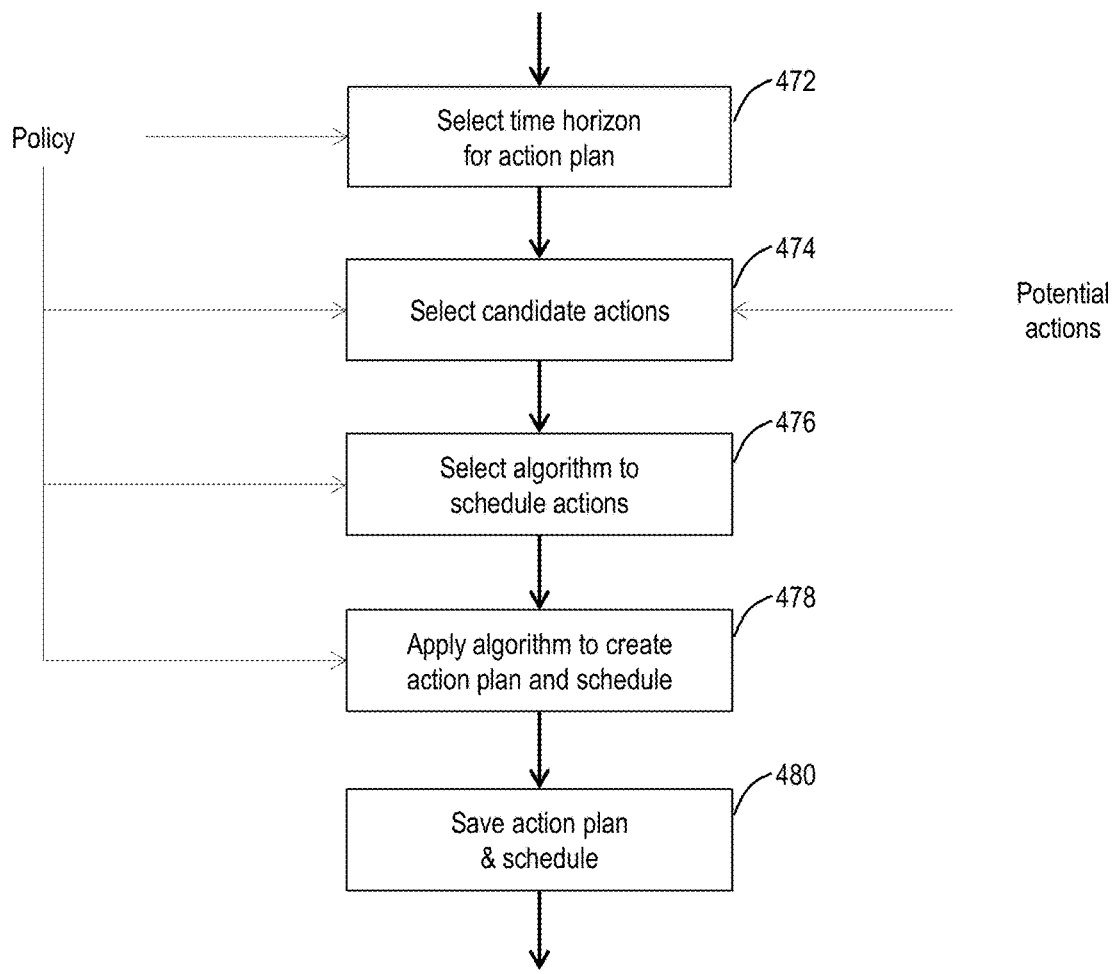
FIG. 8 is a flowchart of additional detail of a process for generating a schedule of actions in the process of FIG. 5.

Referring to FIG. 8, in an exemplary embodiment, a flowchart illustrates additional detail of a process 470 for generating a schedule of actions (step 410) in the process 400. The process 470 includes selecting a time horizon for the action plan (step 472). The time horizon is a user-defined quantity and is specified in the policy. Typically, the action plan will have a finite time horizon such as with the same duration as the traffic forecast. Next, the process 470 includes selecting candidate actions (step 474), from a set of potential actions and based on policy. The potential actions are filtered to produce a set of admissible candidate actions under the direction of the user-defined policy. Examples of filtering include designating actions such as installing equipment inadmissible because of inadequate lead times and ensuring that equipment installations are no more frequent than a user defined minimal period. Filtering is performed under the guidance of policy.

Next, the process 470 includes selection of an algorithm to schedule the actions (step 476), based on policy. The goal is to construct a plan that applies the candidate actions to the network 10 in a way that the capacity requirements of the forecast are met while cost is minimized. This has the natural structure of an optimization problem, but it is not necessary to use this approach: a simple policy/rule driven approach may be used where the interval separating applications of the actions is fixed, and all candidate options are evaluated in a predefined order at each time. A more complex approach would construct a decision tree from the traffic forecast and would analyze the candidate options by traversing the nodes of the tree using dynamic programming or stochastic optimization to find the schedule that minimizes costs. Alternatively, various potential schedules could be generated using a Monte-Carlo simulation with the least cost schedule being selected. The selection of the algorithm to be used could be policy driven, or a specialized decision algorithm could make the selection based on balancing the need to produce timely results, control computational effort, or accuracy of results. Next, the process 470 includes applying the algorithm to create the action plan and schedule (step 478), based on policy. Finally, the process 470 includes saving the action plan and schedule (step 480).

Potential Actions

Figure 9:
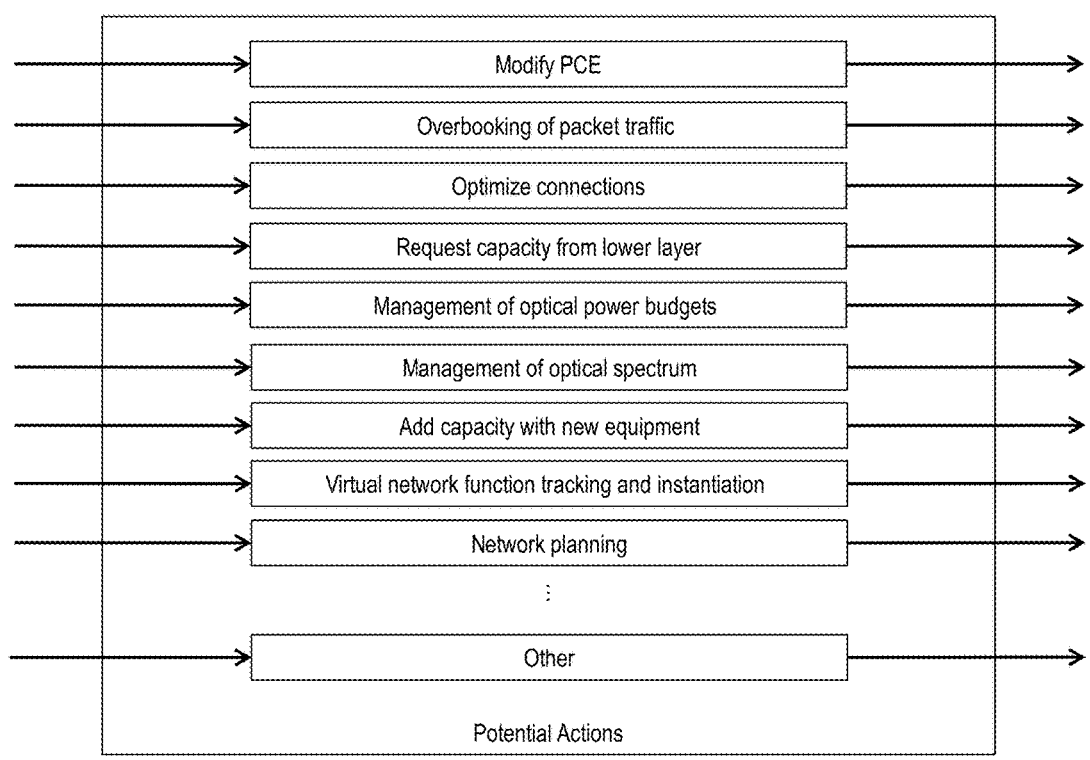
FIG. 9 is a block diagram of an exemplary set of potential actions, for use in the process of FIG. 5.

Referring to FIG. 9, in an exemplary embodiment, a block diagram illustrates an exemplary set 500 of potential actions, for use in the process 400. The set 500 can be implemented through the network apps 308. The PCE 330 can include modification to Link costs, weights, bandwidth reservation levels, or other parameters used to control path computation to steer connections to a more efficient use of resources. The congestion management 340 can include overbooking of packet traffic by changing packet traffic overbooking parameters to remove network congestion. The capacity reclamation 338 can optimize connections where stranded bandwidth may be reclaimed by defragmenting bandwidth in multiple layers. Existing and scheduled connections can be moved to more efficiently use network resources and thereby reduce the probability of resource shortages and blocked connection requests.

The PCE 330 can request capacity from a lower layer. New links can be created or existing links reinforced with additional capacity layer k (for example, at layer 2) by altering connections and allocated bandwidth at layer k–r (for example, at layer 0). The power management 334 can include management of optical power budgets where optical power budgets may be adjusted to match traffic patterns and shift capacity in the network. The spectrum management 332 can include management of optical spectrum where the width of optical signals may be adjusted to match traffic patterns and shift capacity in the network. The inventory management 336 can include adding capacity with new equipment added to the physical plant. The VNF management 342 can include Virtual network function tracking and instantiation. The performance of virtual network functions may be tracked for performance, and new virtual network functions may be added to improve network performance. Network planning can use network traffic forecasts to plan equipment installation before the network becomes too congested. Of course, the systems and methods contemplate other potential actions with the foregoing list provided illustrative examples.

Traffic Forecasting

Figure 10:
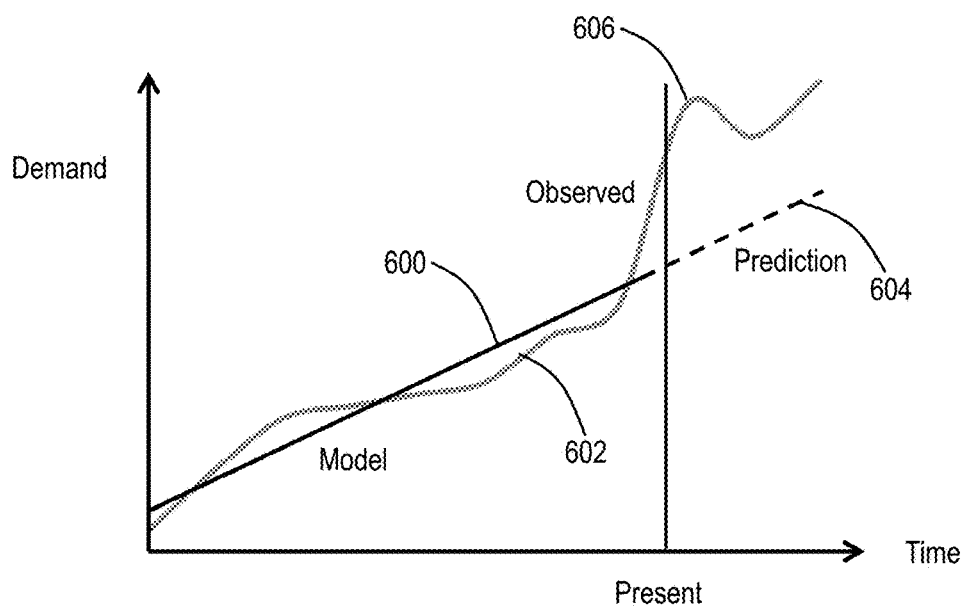
FIGS. 10-14 are graphs of various scenarios associated with traffic forecasting for the traffic-adaptive network control systems and methods.

Referring to FIGS. 10-14, in various exemplary embodiments, graphs illustrate various scenarios associated with traffic forecasting for the traffic-adaptive network control systems and methods. The Demand Predictor takes the traffic data that has been collected, and constructs representations, or demand models that "explain" the observations and that can be used to forecast future traffic. FIG. 10 shows a simple traffic demand model 600 for a single A->Z connection in the network 10 plotted against time. In this example, the model 600 is a regression line fit to data up to the present time by minimizing the sum of the squares of the errors between the model 600 in the past and observed data 602. The model 600 is used to generate a forecast 604: the implicit assumption is that the demand model 600 remains valid (that is, the model's "fitting parameters" do not change, and the model 600 can accurately predict future observations). In the example, beyond the present time, there is a shift 606 in traffic demand that produces large forecast errors (the difference between the observed demand and forecast) producing a loss of explanatory or representation power for the model 600.

Figure 11:
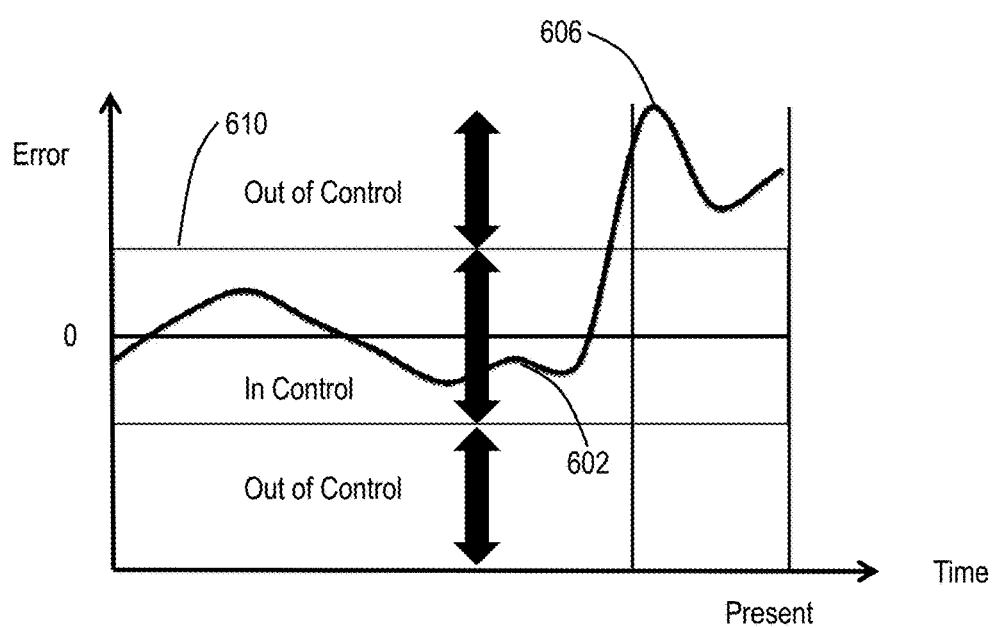

FIG. 11 shows the prediction errors (=observations−predictions) after time has advanced. FIG. 11 shows a band 610 around the 0-error line: the upper and lower boundaries of this region were derived from the process of fitting the model 600 (selecting model parameters to minimize the approximation error) to the observations by requiring that the band 610 contain a majority (say 95%) of the errors. If this condition is satisfied, the prediction process is said to be in control. FIG. 11 shows that for recent observation, the prediction model 600 has errors that are in the out of control region. When the prediction model 600 is out of control it no longer faithfully represents the data 602, and corrective action is required. This example is based on the ideas from statistical process control that employs control charts similar to the one below. A modern version of this is used for optimal change point detection in sequential observations of a time series. The goal is to most rapidly detect a change point while minimizing the probability of false positive indications. The analysis of prediction errors to detect change points or shifts is called the error model herein.

Figure 12:
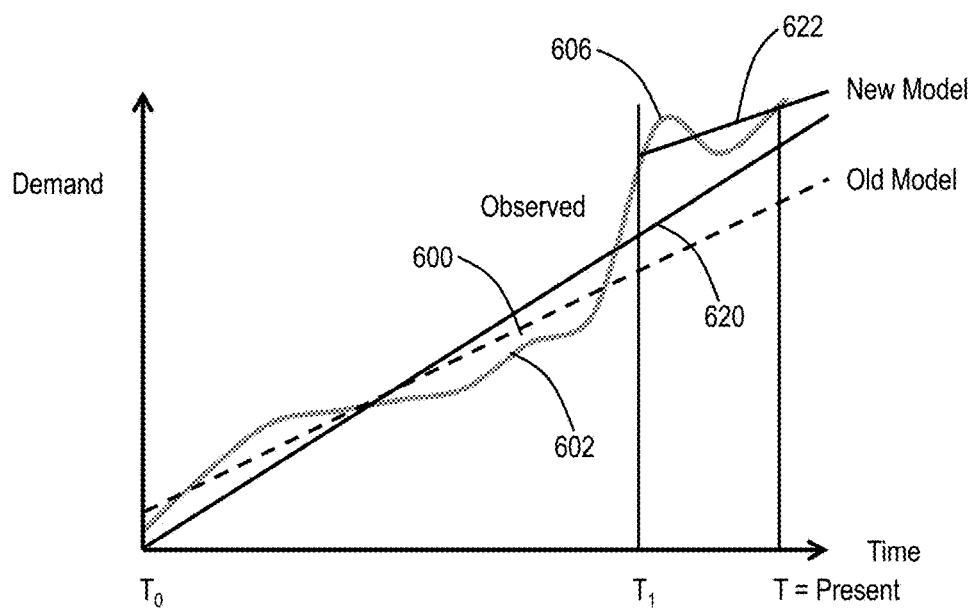

When a traffic demand prediction is out of control, fitting the underlying demand model 600 to new observations will in general produce poor results: as an example, in FIG. 12, if the model 600 is a regression line was fit to a window from time $T_0$ time $T_1$ then a refit using data up to T=present time produces a new model 620 which does a poor job of explaining recent data. A better fit, as shown in FIG. 12, is produced by detecting that a traffic shift has occurred near $T_1$ and then, in response, fitting a new regression line 622 to the smaller data window from $T_1$ to T displaying a better fit. Consider each pair of an interval $T_1$ to $T_2$ together with a model fit to this window as a distinct model. The set of such pairs is the total set of models that can be considered as candidates. The process of modeling a traffic shift then includes two steps: (1) detecting the shift as described in FIGS. 10, 11, and 12, and (2) selecting a new model from the set of admissible (allowed) models. In practice, more complex models can be used than the simple examples here, but the principles are the same. The result is that the error model is continually restored to an in-control state by selecting and fitting new models from the admissible set.

Figure 13:
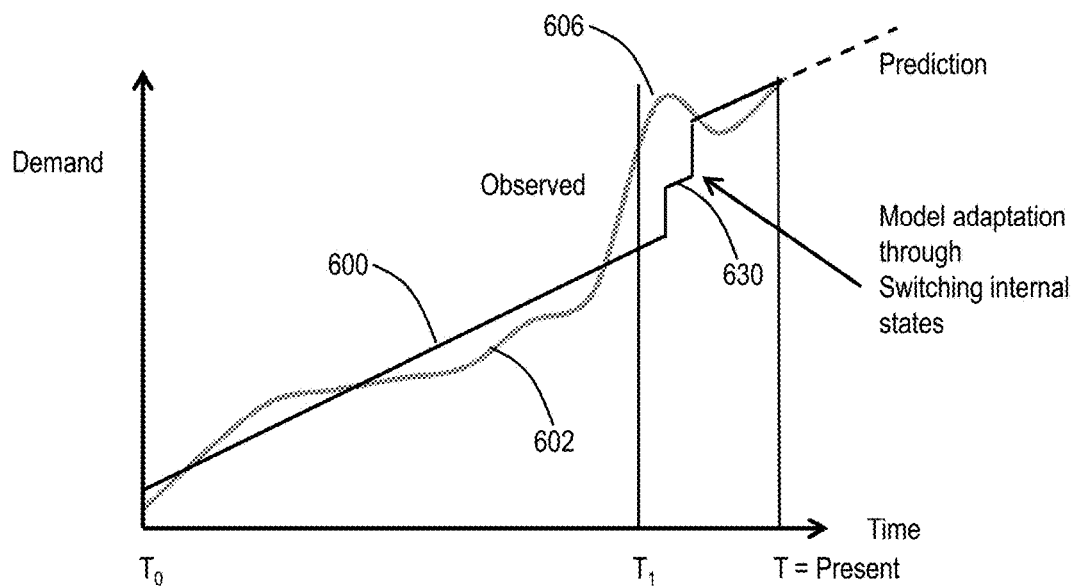

In FIG. 13, an alternative approach to handling traffic shifts and their detection is to use more complex models that introduce explicit internal states 630 to directly represent different "regimes" that characterize the evolution of the observed demand process. The statistical process that fits the free parameters of the model to data is then responsible for deciding, at each time, the particular regime that the model is in by selecting the appropriate internal state. Two examples of processes that have these attributes are Hidden Markov Models and Markov Modulated Poisson Processes. The result is a process that is always in control by construction.

Figure 14:
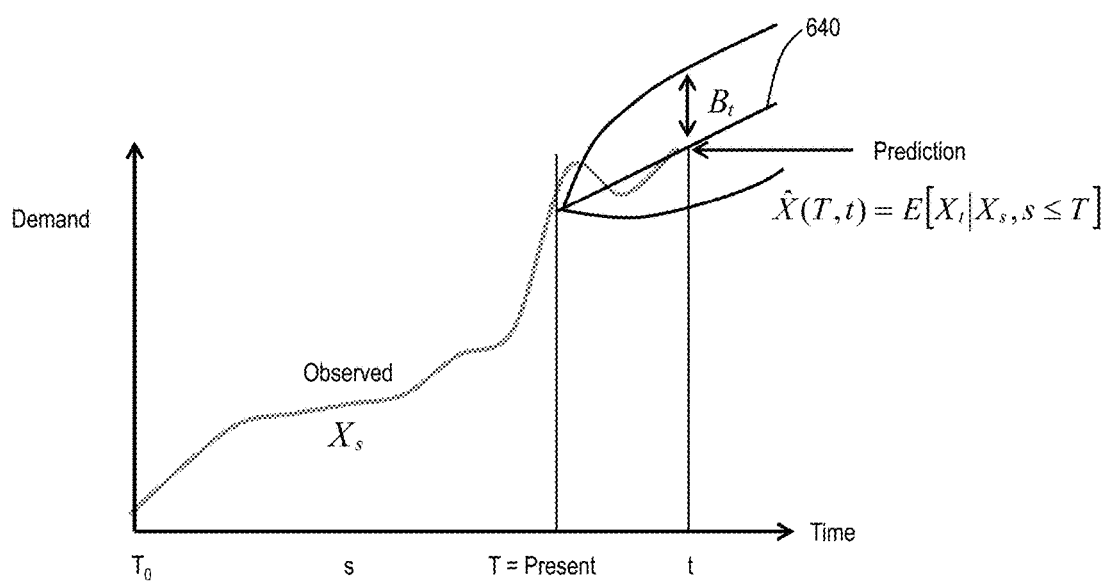

In FIG. 14, once a model has been selected and has been fit to the observed data up to time T and is in control, it can be used for making predictions 640. The optimal prediction (the one that minimizes expected mean-square errors) of a random process $X_t$ at time t>T is the conditional expectation at time t given the observation history $X_s$ for s taking values up to time T, that is:

$$E[X_t | X_s, s \leq T]$$

The conditional expectation requires a knowledge of the distribution of $X_t$ at time t for its computation. Knowing this distribution allows more complex predictions to be constructed: for example, the quantiles $B_t$ that bracket the conditional expectation with a specified probability p can be found.

$$Pr[|X_t - \hat{X}(T,t)| \leq B_t | X_s, s \leq T] = p$$

Because of the wide range of potential traffic altering external events and the characteristics of their impacts a range of responses is required. These responses can be grouped into two roles (1) monitoring and assessing external events and (2) adjusting traffic forecasts to reflect external events.

For monitoring and assessing external events to evaluate the potential of these events to impact current or future traffic demand, an assessment is made to determine if the event has a temporary or permanent impact and the severity of the impact. These assessments could be made using (local) historical information about similar events processed by machine learning, statistical, rule-based or other algorithms, or they could be supplied by third parties specializing in the particular type of data or analysis required. An unexpected natural or man-made disaster can cause an immediate change in traffic. Weather events would be evaluated to assess their predicted start, duration, severity, and expected location. Impact assessments would likely be provided by specialist third parties in this case. Sporting events would be assessed using known time, location, and duration, and with expected impact predicted from historical data about similar events. The impact of opening a new office building would be assessed using the size of the employee base, the nature of the business, and historical information about business communication characteristics: the latter could be derived from historical billing records (for example, CDR—Call Detail Record data). The duration may be permanent, but there may be a ramp-up if new tenants are only expected to arrive over time.

For adjusting traffic forecasts to reflect external events, once the traffic impact of an external event has been determined, the traffic forecast can be updated to reflect this impact. For immediate events, the impact is directly visible through observations of the traffic. Specialized traffic models can be used in this case that includes exogenous inputs for traffic stimulating events allowing external information (such as the severity of the event, or its expected duration) to "modulate" the adjustment in a way that models based purely on traffic observations would not allow. For expected events, existing forecasts need to be updated solely on the basis of information about the external event that is anticipated. The adjustment can be as simple as a temporary or permanent additive increase or can be more complex including a range of possible outcomes together with probabilities of the occurrence. If the forecasts are expressed in terms of conditional expectations, then standard mathematical procedures exist for making the adjustments.

Action Orchestration

Figure 15:
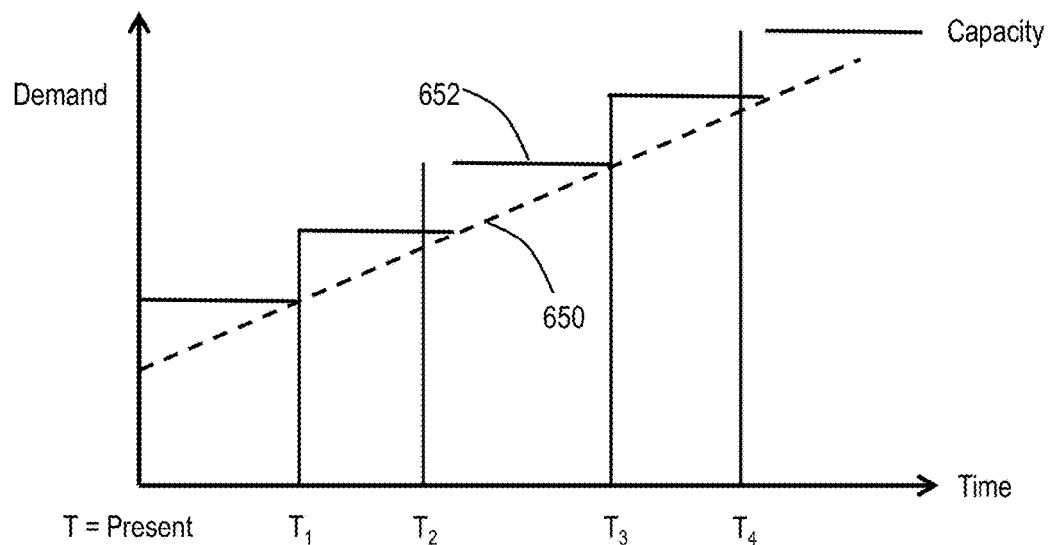
FIGS. 15-23 are graphs and decision trees of various aspects of action orchestration for the traffic-adaptive network control systems and methods.

Referring to FIGS. 15-23, in various exemplary embodiments, graphs and decision trees illustrate various aspects of action orchestration for the traffic-adaptive network control systems and methods. FIG. 15 shows an example of a demand prediction 650 for a single network element (say a link) made at time T as a conditional expectation. At time T, the prediction 650 is completely deterministic and represents in some sense the most likely evolution of the demand process. Suppose, in an exemplary implementation, that at each time T an app orchestrator 302 has available such a (deterministic) forecast. Also, suppose that the orchestrator has available a set of adaptation options that include but are not limited to controlling routing algorithms (by changing link weights), moving existing or scheduled connections, adding physical capacity, etc.

A major role of the app orchestrator 302 is to apply selections from these options singly or in combination at times selected to ensure that network capacity 652 is adequate to handle the demand and to do so in a way that minimizes the total cost of managing the capacity over the life of the forecast. For example, at $T_1$ and $T_3$ an option was applied (such as connection reconfiguration) that did not require any lead time whereas at $T_2$ and $T_4$ equipment was added requiring lead time to order, install, and bring up the capacity. The app orchestrator 302 is responsible for maintaining a schedule of the option activation selections and invoking them as they come due.

One way to select the times $T_k$ and the actions to perform at each of these times is as follows: assume time is discrete and work recursively from the latest to the earliest time, selecting those options that minimize the running future cost along the way. In this case, no expectations are involved because the forecast is deterministic (=conditional expectation).

Figure 16:
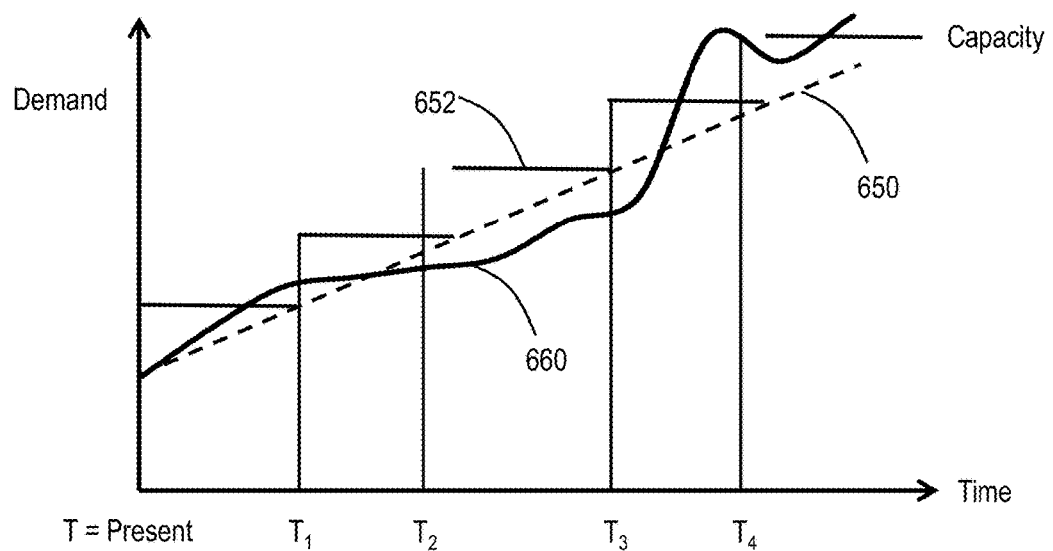

In FIG. 16, the actual demand 660, however, evolves as a random process and may drift quite far from this forecast over time. If the app orchestrator 302 did not compensate for this and continued to use an old option invocation schedule, then the scenario depicted in FIG. 16 could result. This shows that by time $T_1$ the capacity planned at time T has been exceeded.

Figure 17:
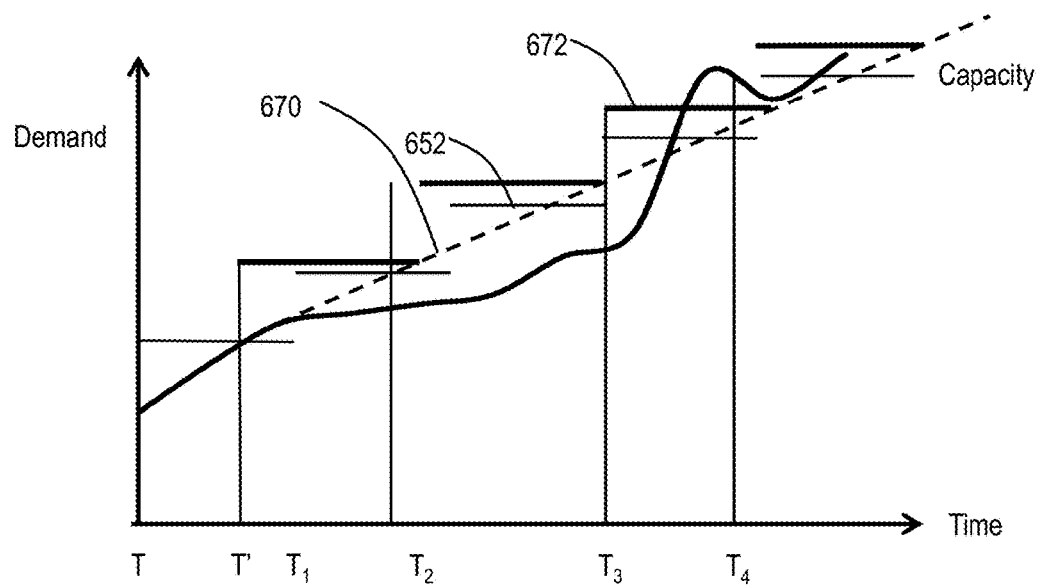

In FIG. 17, one solution to the use of deterministic forecasts to generate orchestration schedules is to update these sufficiently often (ideally continuously in time—in practice often enough to minimize the type of mismatch under discussion as well as the cost of forecasting and constructing the schedules). FIG. 17 shows that by time T' the original demand forecast and orchestration plan developed at time T are no longer adequate. It shows a new forecast 670 and new capacities 672 that are invoked at different times and produce different capacities than the original plan. This process then continues in time to ensure an ongoing good match between the best view of the evolving demand and scheduled orchestration options that ensure the network capacity is adequate. So far the forecast has been viewed as deterministic when looking forward from any fixed time. Over the next few FIGS., an option is considered that relaxes this viewpoint.

Figure 18:
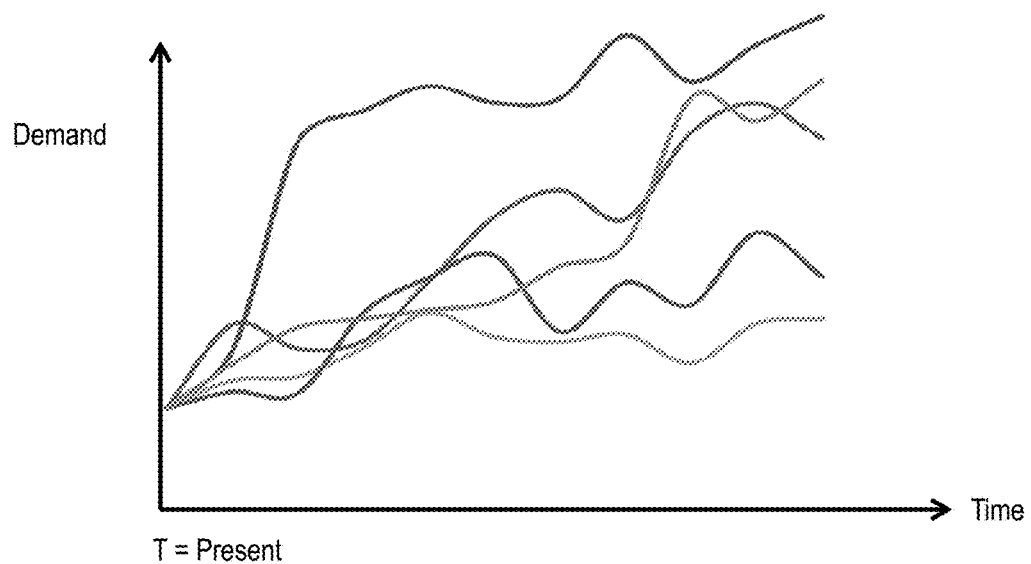

FIG. 18 shows a set of possible demand evolution curves viewed from the current time T. One of these is the "real curve" that will be observed as time elapses, but at time T, they are all only possible trajectories each with a certain probability of occurrence. The entire ensemble of possible trajectories can be viewed supplemented by the probability of occurrence as the traffic forecast. The traffic demand model can be used to construct a more compact and convenient representation of this ensemble. For example, suppose that the traffic model is a diffusion as described by the stochastic differential equation (a and b are constants, and $W_t$ is a standard Wiener process)

$$dX_t = aX_t \cdot dt + bX_t \cdot dW_t$$

The probability distributions of the trajectories can be found in closed form and turn out to be expressible in terms of the standard normal distribution. In practice, it is simpler to work with discrete time and state versions of such processes.

Figure 19:
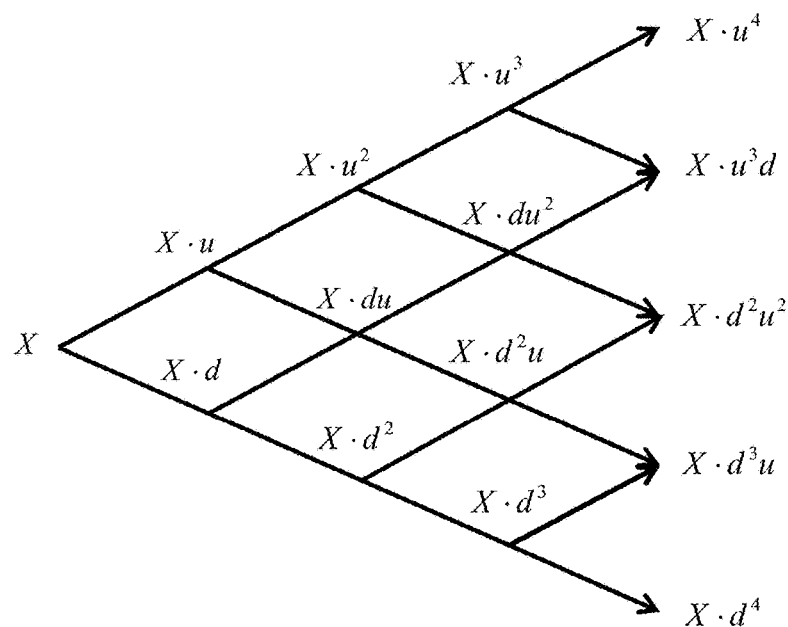

In FIG. 19, the probability distributions of the trajectories of the diffusion processes (and many other processes) considered as examples of demand processes can be approximated by discrete time and state versions. For example, pick a discrete unit of time $\Delta t$ and set $v=(a-b/2) \cdot \Delta t$ and $\sigma^2 = b^2 \cdot \Delta t$, probabilities can be defined as $p=(1+(v/\sigma)\sqrt{\Delta t})/2$ and $q=1-p$ and "jumps" up $u=\exp(+\sigma\sqrt{\Delta t})$ and down $u=\exp(-\sigma\sqrt{\Delta t})$. The trajectories of the diffusion can then be modeled as jumps in the discrete time and state lattice shown in FIG. 19. The process starts at the leftmost node at time 0 with demand X and proceeds to the right in increments of $\Delta t$. At each node, the trajectory jumps up with probability p and down with probability q. At time $\Delta t$ (after the first jump), the demand is therefore X·u with probability p and X·d with probability q. The demand forecast is then represented by the lattice shown in FIG. 19. Shifts in demand due to predicted traffic-affecting events can be easily incorporated into this structure, and all required probabilities can be readily computed from it.

Figure 20:
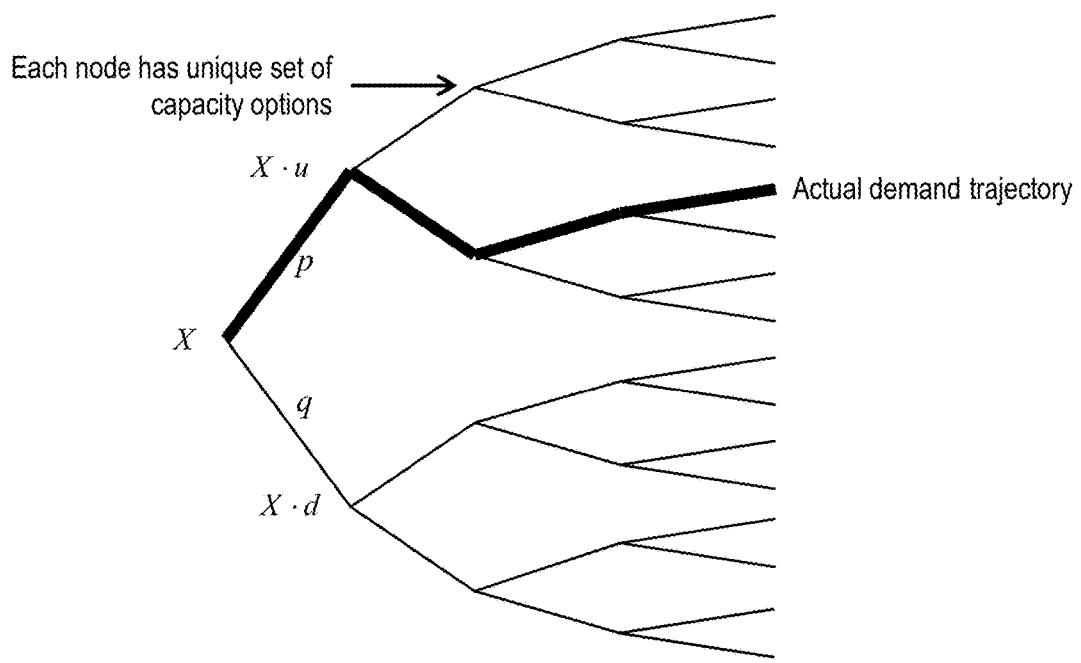

In FIG. 20, once there is a discretized version of the demand forecast as described in FIG. 19, it can be used to construct a decision tree as shown in FIG. 20. Just like the demand lattice, the decision tree is traversed in unit time jumps from left to right. The leftmost "start" node represents the state of the network at the present time (0 for example). While, in this node, the orchestrator has a number of options that it can apply to manage the capacity of the network, including physically adding equipment, each option having an associated cost. For the moment, it is not necessary to determine how the app orchestrator 302 makes a choice except to say that the total set of orchestration decisions that it makes must minimize total cost in some sense. Each node, therefore, has associated with it a set of selected orchestration options that are to be applied. Once the decision tree has been constructed and the node options chosen, the actual network demand evolution can be "tracked" as a path of jumps up or down through the decision tree shown as the highlighted path in FIG. 20. The app orchestrator 302 then applies the options at each node as it reaches that node.

Figure 21:
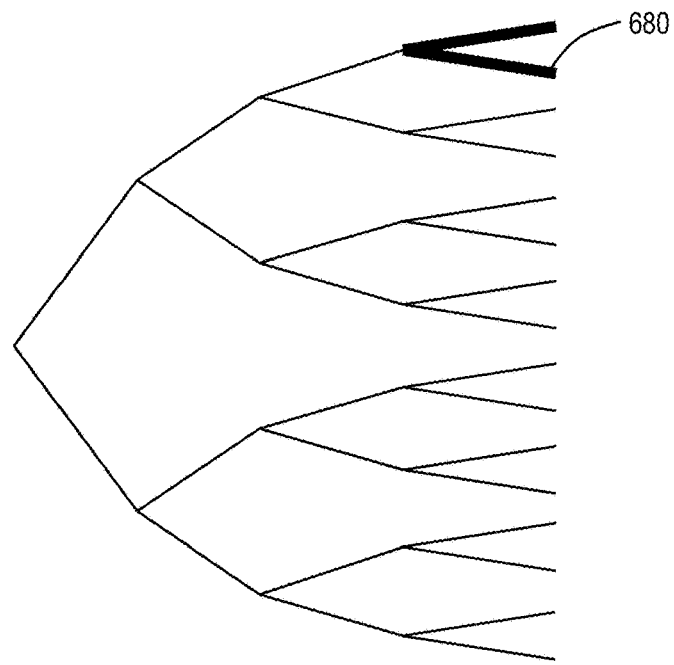

In FIG. 21, an exemplary technique for how the decision tree can be used to select the options that the app orchestrator 302 must invoke upon entry a given node. Start at the terminal nodes at the extreme right. Consider the top two 680: at the root of these two branches there are a number of capacity management options available for consideration. If one of these is picked, there will be a cost $C_u$ if the upper branch is taken and $C_d$ if the lower branch is taken. These costs must reflect the possibility that the option may have insufficient capacity to handle the demand. The expected cost of exercising the option is then computed at the node (potentially using a discount factor to deal with the time value of money). For this example, this is:

$$E[\text{Option}] = p \cdot C_u + q \cdot C_d$$

This calculation is performed for every option that is available, and the least cost option is selected. The cost and option choice are recorded against the node (more generally a set of options can be picked if one is not sufficient to generate the required capacity).

Figure 22:
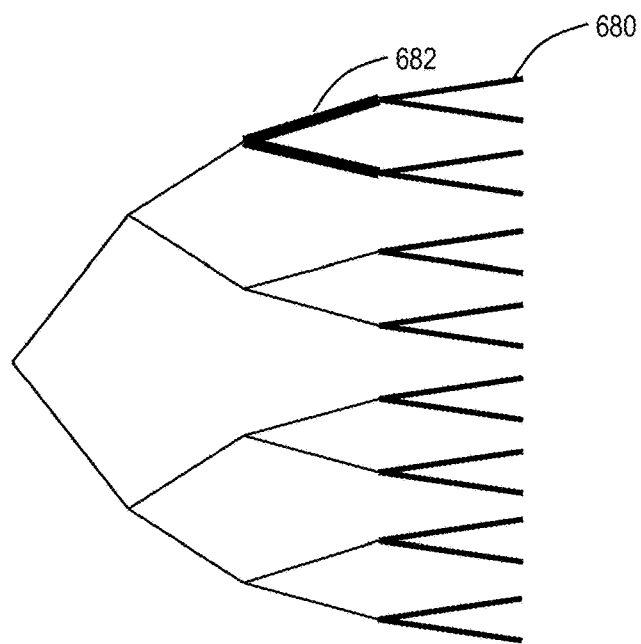

In FIG. 22, in a similar fashion to the description above, the expected costs of the best options for all root nodes is computed on the branches leading to the terminal nodes on the right. At this point, the best options and costs have been computed for all nodes one-time unit from the end of the forecast window. This can continue recursively. Consider an uppermost node 682 that is the root of the two 680 branches. This node is two-time units back from the terminal nodes. As before, pick one of the capacity management options available for consideration: there will again be a cost $C_u$ if the upper branch is taken and $C_d$ if the lower branch is taken. These costs are the expected costs that have been recorded against nodes at the end of the branches. Again, compute the expected cost $$E[\text{Option}] = p \cdot C_u + q \cdot C_d$$

More complex version of this algorithm may be needed that require a forward traverse through the lattice or an iteration of forward reverse and forward iterations depending on the characteristics of the resources involved.

This approach can be readily generalized to include more complex demand models such as discrete state Markov Chains. In this case, the demand forecast moves through a grid instead of a lattice, but the underlying principles are the same as those described here. Markov Chains can be viewed as discretizations of more complex diffusions $$dX_t = f(t, X_t) \cdot dt + g(t, X_t) \cdot dW$$

which can exhibit complex behavior.

So far, two examples of option orchestration have been described. Others are possible. Option orchestration could be completely policy driven. Consider as a very simple example the case of two options being used—(1) bandwidth defragmentation through moving connections (scan all connections and move all those whose hop-count*bandwidth product can be reduced) and (2) addition of physical capacity.

Further, suppose that capacity addition can only occur at integer multiples of a period $P_1$ set by policy and that defragmentation can only occur at integer multiples of a period $P_2 < P_1$ set by policy. If capacity costs (per unit) and defragmentation costs (per scan) are known from policy, then a cost-minimal schedule can be developed using linear programming.

The lattice-based decision trees described herein can become very large and challenging to handle using dynamic programming. In such cases, a near-optimal schedule can be constructed using Monte-Carlo simulation where trajectories would be simulated using the probabilities of the underlying binomial lattice (or other representation of the traffic forecast) with options exercised at random along the way and running costs calculated. The lowest cost trajectory selected from a large ensemble of simulated trajectories could then be selected as the action schedule that could be used to manage the network resources.

Figure 23:
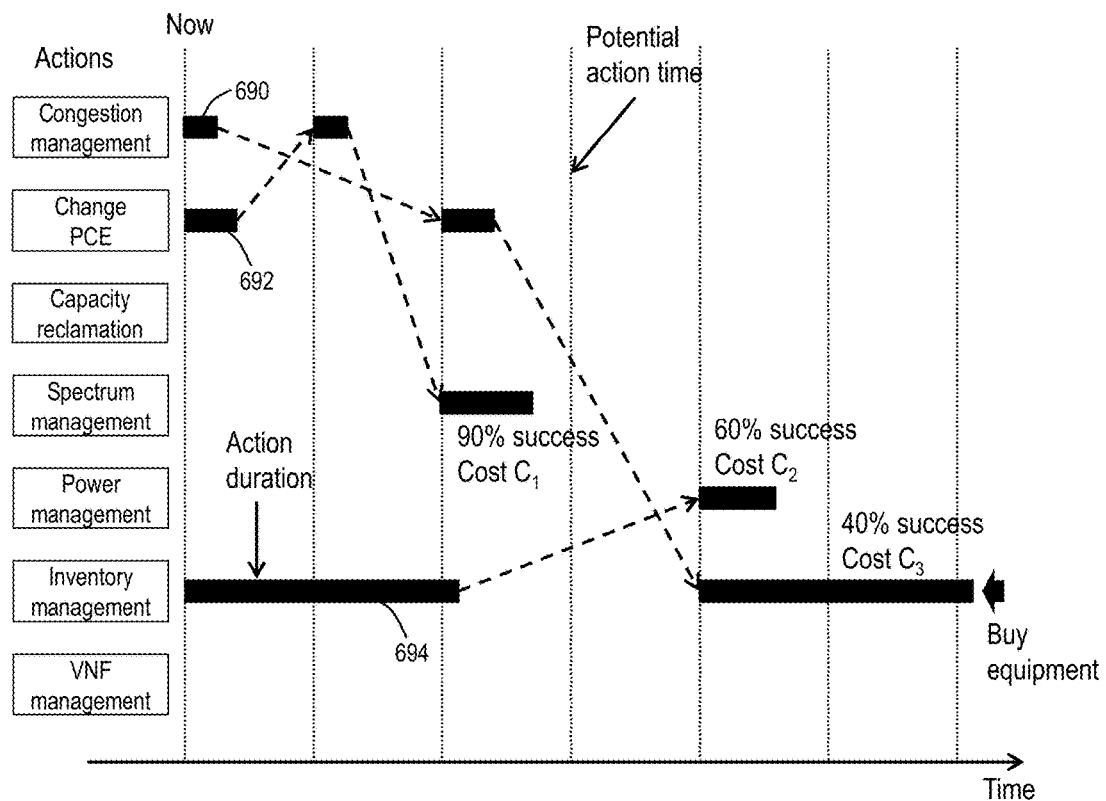

FIG. 23 illustrates another approach to action orchestration. The various actions are shown on the left along with paths over time. Paths 690, 692, 694 are all potential actions with a probability of success and cost, i.e., the probability of success related to forecasting reliability (forecasts less reliable further into future). Since $C_1 < C_2 < C_3$, the path 690 is chosen as the set of actions.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A traffic-adaptive network control method for a network, implemented by a server, the method comprising:
   monitoring data associated with the network;
   generating a traffic forecast based on the monitored data;
   generating a schedule of actions based on a comparison of the traffic forecast to observed data; and
   causing orchestration of the actions in the network based on the generated schedule, wherein the actions are performed by one or more network applications and include altering routing by changing parameters in a Path Computation Engine, moving existing or scheduled connections to new paths, and acquiring capacity at network layer k from network layer k−1, wherein the actions of altering, moving, and acquiring are determined based on a combination of associated costs related to time and associated benefits related to bandwidth,
   wherein generating the schedule of actions comprises utilizing a decision tree from the traffic forecast to analyze candidate options of nodes of the decision tree using stochastic optimization to find a schedule that minimizes costs.

2. The method of claim 1, wherein the network comprises a Software Defined Networking (SDN) network.

3. The method of claim 1, wherein the monitoring data comprises:
   monitoring traffic demands comprising packet volumes and connection setup and release requests in the network; and
   monitoring external events from exogenous data.

4. The method of claim 3, wherein the generating the traffic forecast comprises:
   maintaining a representation of traffic demand from the monitored traffic demands;
   generating a forecast from the representation based on a set of possible traffic evolution trajectories; and
   adjusting the forecast based on the external events.

5. The method of claim 1, wherein the actions are performed in the network to one or more of recover capacity, reallocate capacity, and add capacity.

6. The method of claim 1, wherein the actions are further performed by adding network equipment.

7. The method of claim 1, further comprising:
   generating an updated traffic forecast responsive to detecting a shift between the traffic forecast and the observed data.

8. The method of claim 7, further comprising:
   generating a new schedule of actions based on a comparison of the updated traffic forecast to observed data.

9. The method of claim 1, wherein the generating the schedule of actions further comprises:
   using a Monte-Carlo simulation with a least cost schedule being selected.

10. The method of claim 1, wherein the actions comprise one or more of:
    modification of link costs, weights, bandwidth reservation levels, and parameters used to control path computation to steer connections to a more efficient use of resources;
    changing packet traffic overbooking parameters to remove network congestion;
    reclaiming stranded bandwidth by defragmenting bandwidth in multiple network layers;
    requesting capacity from a lower network layer in the network;
    adjusting optical power budgets to match traffic patterns and shift capacity in the network;
    adjusting width of optical signals to match traffic patterns and shift capacity in the network;
    adding capacity with new equipment; and
    adding new Virtual Network Functions.

11. A traffic-adaptive network control apparatus for a network, the apparatus comprising:
a network interface and a processor communicatively coupled to one another; and
memory storing instructions that, when executed, cause the processor to
monitor data, received by the network interface, associated with the network,
generate a traffic forecast based on the monitored data,
generate a schedule of actions based on a comparison of the traffic forecast to observed data, and
cause orchestration of the actions in the network based on the generated schedule, wherein the actions are performed by one or more network applications and include altering routing by changing parameters in a Path Computation Engine, moving existing or scheduled connections to new paths, and acquiring capacity at network layer k from network layer k−1, wherein the actions of altering, moving, and acquiring are determined based on a combination of associated costs related to time and associated benefits related to bandwidth,
wherein the schedule of actions comprises utilization of a decision tree from the traffic forecast to analyze candidate options of nodes of the decision tree using stochastic optimization to find a schedule that minimizes costs.

12. The apparatus of claim 11, wherein the network comprises a Software Defined Networking (SDN) network.

13. The apparatus of claim 11, wherein, to monitor the data, the memory storing instructions that, when executed, further cause the processor to
monitor traffic demands comprising packet volumes and connection setup and release requests in the network, and
monitor external events from exogenous data.

14. The apparatus of claim 13, wherein, to generate the traffic forecast, the memory storing instructions that, when executed, further cause the processor to
maintain a representation of traffic demand from the monitored traffic demands,
generate a forecast from the representation based on a set of possible traffic evolution trajectories, and
adjust the forecast based on the external events.

15. The apparatus of claim 11, wherein the actions are performed in the network to one or more of recover capacity, reallocate capacity, and add capacity.

16. The apparatus of claim 11, wherein the actions are further performed by adding network equipment.

17. The apparatus of claim 11, wherein the memory storing instructions that, when executed, further cause the processor to
generate an updated traffic forecast responsive to detecting a shift between the traffic forecast and the observed data.

18. The apparatus of claim 17, wherein the memory storing instructions that, when executed, further cause the processor to
generate a new schedule of actions based on a comparison of the updated traffic forecast to observed data.

19. The apparatus of claim 11, wherein the schedule of actions further comprises:
using a Monte-Carlo simulation with a least cost schedule being selected.

20. A Software Defined Networking (SDN) network system, comprising:
a plurality of interconnected nodes comprising network devices adapted to provide traffic at a capacity between one another at one or more network layers;
an SDN controller implemented on a server that is communicatively coupled to one or more of the plurality of interconnected nodes;
a plurality of network applications executed on one or more servers that are communicatively coupled to the SDN controller and the plurality of interconnected nodes; and
an application orchestrator executed on a server that is communicatively coupled to the SDN controller and the plurality of network applications, wherein the application orchestrator is adapted to
monitor data associated with the network;
generate a traffic forecast based on the monitored data;
generate a schedule of actions based on a comparison of the traffic forecast to observed data; and
cause orchestration of the actions in the network based on the generated schedule, wherein the actions are performed by one or more network applications and include altering routing by changing parameters in a Path Computation Engine, moving existing or scheduled connections to new paths, and acquiring capacity at network layer k from network layer k−1, wherein the actions of altering, moving, and acquiring are determined based on a combination of associated costs related to time and associated benefits related to bandwidth, and
wherein the schedule of actions comprises utilization of a decision tree from the traffic forecast to analyze candidate options of nodes of the decision tree using stochastic optimization to find a schedule that minimizes costs.

* * * * *